(12) United States Patent
Kihara et al.

(10) Patent No.: US 11,104,080 B2
(45) Date of Patent: *Aug. 31, 2021

(54) LASER WELDED BODY AND METHOD FOR MANUFACTURING SAME

(71) Applicant: ORIENT CHEMICAL INDUSTRIES CO., LTD., Osaka (JP)

(72) Inventors: Tetsuji Kihara, Neyagawa (JP); Satoshi Yamamoto, Neyagawa (JP)

(73) Assignee: ORIENT CHEMICAL INDUSTRIES CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,427

(22) Filed: Aug. 5, 2019

(65) Prior Publication Data

US 2019/0351623 A1 Nov. 21, 2019

Related U.S. Application Data

(63) Continuation-in-part of application No. PCT/JP2018/016444, filed on Apr. 23, 2018.

(30) Foreign Application Priority Data

Jun. 29, 2017 (JP) .............................. JP2017-127750
Oct. 16, 2017 (JP) .............................. JP2017-200325

(51) Int. Cl.
*B32B 7/04* (2019.01)
*B29C 65/16* (2006.01)
(Continued)

(52) U.S. Cl.
CPC .......... *B29C 65/1677* (2013.01); *B32B 7/027* (2019.01); *B32B 7/04* (2013.01);
(Continued)

(58) Field of Classification Search
CPC .... B32B 2262/0269; B32B 2262/0276; B32B 2262/101; B32B 2262/103;
(Continued)

(56) References Cited

U.S. PATENT DOCUMENTS 4,636,609 A 1/1987 Nakamata
6,395,809 B1 5/2002 Hayashi et al.
(Continued)

FOREIGN PATENT DOCUMENTS

CN 1751091 A 3/2006
JP S62-049850 B2 10/1987
(Continued)

OTHER PUBLICATIONS

Jun. 12, 2018 International Search Report issued in International Patent Application No. PCT/JP2018/016444.
(Continued)

*Primary Examiner* — Lawrence D Ferguson
(74) *Attorney, Agent, or Firm* — Oliff PLC

(57) ABSTRACT

Provided is a laser welded body which can be manufactured without undergoing complicated steps and maintain the characteristics of a resin contained in a resin member, which exhibits high welding strength even when scanned with a laser beam at a high speed, and which can be manufactured at high production efficiency.

The laser welded body 10 comprises a first resin member 1 which is a laser-irradiated subject which contains a thermoplastic resin and nigrosine sulfate and has an absorbance $a_1$ of 0.09 to 0.9; and a second resin member 2 which contains a thermoplastic resin as the same kind as or different kind from the thermoplastic resin and a laser beam absorbent, and has an absorbance $a_2$ of 3.0 to 15, wherein the first resin (Continued)

member 1 and the second resin member 2 are laser-welded at a part at which the both resin members are overlapped and/or butted.

11 Claims, 6 Drawing Sheets

(51) Int. Cl.
*B32B 7/027* (2019.01)
*B32B 27/08* (2006.01)
*B32B 27/20* (2006.01)
*C08K 3/04* (2006.01)
*C08K 5/08* (2006.01)
*C08K 5/3465* (2006.01)

(52) U.S. Cl.
CPC ............ *B32B 27/08* (2013.01); *B32B 27/20* (2013.01); *C08K 3/04* (2013.01); *C08K 5/08* (2013.01); *C08K 5/3465* (2013.01); *B32B 2264/104* (2013.01); *C08K 2201/005* (2013.01); *C08K 2201/006* (2013.01); *C08K 2201/011* (2013.01)

(58) Field of Classification Search
CPC ........ B32B 2262/105; B32B 2262/106; B32B 2262/108; B32B 2264/101; B32B 2264/102; B32B 2264/104; B32B 2264/107; B32B 2264/108; B32B 2307/40; B32B 2307/4026; B32B 2307/54; B32B 2307/732; B32B 2439/70; B32B 2457/00; B32B 2535/00; B32B 2597/00; B32B 2605/003; B32B 27/08; B32B 27/18; B32B 27/20; B32B 27/22; B32B 27/286; B32B 27/302; B32B 27/304; B32B 27/306; B32B 27/308; B32B 27/32; B32B 27/34; B32B 27/36; B32B 27/365; B32B 27/38; B32B 7/023; B32B 7/027; B32B 7/04; B32B 7/08; C08K 2201/005; C08K 2201/006; C08K 2201/011; C08K 3/04; C08K 5/08; C08K 5/3447; C08K 5/3465; C08L 101/00
See application file for complete search history.

(56) References Cited

U.S. PATENT DOCUMENTS

| | | |
|---|---|---|
| 2005/0003301 A1 | 1/2005 | Sugawara et al. |
| 2005/0203225 A1* | 9/2005 | Nakagawa ........ B29C 66/73921 524/190 |
| 2006/0142451 A1 | 6/2006 | Yushina et al. |
| 2006/0175004 A1 | 8/2006 | Kurosaki et al. |
| 2007/0065659 A1 | 3/2007 | Kihara et al. |
| 2009/0136717 A1 | 5/2009 | Kihara et al. |
| 2010/0186886 A1 | 7/2010 | Kihara et al. |

FOREIGN PATENT DOCUMENTS

| | | |
|---|---|---|
| JP | 2001-011055 A | 1/2001 |
| JP | 2004-351730 A | 12/2004 |
| JP | 2005-281522 A | 10/2005 |
| JP | 2007-112127 A | 5/2007 |
| JP | 2007-231088 A | 9/2007 |
| WO | 2003/039843 A1 | 5/2003 |
| WO | 2004/072175 A1 | 8/2004 |

OTHER PUBLICATIONS

Jun. 12, 2018 Written Opinion issued in International Patent Application No. PCT/JP2018/016444.
Translation of JP2007-112127A (JP2007-112127A was submitted in the Oct. 17, 2019 Information Disclosure Statement).
Apr. 21, 2021 Office Action issued in Chinese Patent Application No. 201880029860.4.

* cited by examiner

LASER WELDED BODY AND METHOD FOR MANUFACTURING SAME

TECHNICAL FIELD

The present invention relates to a laser welded body in which resin members having a specific absorbance are integrated by laser-welding.

BACKGROUND OF THE ART

Lightweight thermoplastic resin products may be employed as parts for vehicles such as automobiles and railways in the field of a traffic art and structural components for the field of electronic and electrical devices instead of employing metals. As a method for bonding among thermoplastic resin members, a laser welding method has been publicly known.

The conventional laser welding method is performed as shown in FIG. 7. A laser-transmissible resin member 11 having laser beam transmittivity is used for one member. A laser-absorptive resin member 12 having laser beam absorbability is used for the other member. A contacted part N is formed by overlapping and contacting these resin members. Irradiation of the laser beam L, which aims from a side of the laser-transmissible resin member 11 toward the laser-absorptive resin member 12, is applied to the contacted part N. And the laser beam L transmitted through the laser-transmissible resin member 11 is absorbed into the laser-absorptive resin member 12, and then exotherm is caused thereat. The exotherm melts the laser-absorptive resin member 12 mainly at a laser-absorbing part therein, and then it melts the laser-transmissible resin member 11 to fuse both resin members. After cooling, the laser-transmissible resin member 11 and the laser-absorptive resin member 12 are welded at the contacted part N. A conventional laser welded body 13 is produced.

The laser welding method has advantages as follows. Welding resin members can be performed as long as a region should be bonded is locally irradiated with the laser beam. Because exotherm is locally generated, thermal influence on a neighborhood except for a welded part is little. No mechanical vibration is generated. Welding fine parts or rein members having three-dimensionally complicated structures can be performed. Reproducibility is excellent. High air-tightness can be maintained. Bonding strength is high. Recognizing a boundary line of a welding position by visual observation is difficult. No dust is generated.

According to the laser welding method, the rein members can be rigidly welded by firmly welding these. In addition, equal or more bonding strength as compared with prior methods for joining resin members is achieved. Examples of the prior methods for joining resin members are clamping by using a clamp (a bolt, a screw, a clip and so on), adhering by an adhesive material, vibration welding, ultrasonic welding and so on. According to the laser welding method, the laser welding method also achieves labor saving, improvement of productivity, lowering of production costs and so on because it is capable of little vibratory and inhibiting minimally thermal influence. Accordingly, in the automobile industry, the electric industry or the electronic industry for example, the laser welding method is suited to bonding functional parts or electronic parts which should avoid the vibratory or thermal influence thereon. Also the laser welding method can be adapted for bonding resin parts having a complicated shape.

As a technique relating to the laser welding method, a laser welding method is disclosed in Patent Document 1. In the method, in order to weld both resin members, a laser-absorptive resin member to which carbon black that absorbs a laser beam is added and a laser-transmissible resin member are overlapped, and then the irradiation of the laser beam from a side of the laser-transmissible resin member is applied thereto. In this case, the laser-transmissible resin member is essential. Welding the laser-transmissible resin member and the laser-absorptive resin member exclusively depends on heat generation and melt of the laser-absorptive resin member because the laser-transmissible resin member does not generate heat and melt by incidence of the laser beam. Accordingly, the resin members cannot be welded so as to achieve excellent welding strength (tensile strength) because an exotherm amount is small per energy of the radiation of the laser beam; heat efficiency is low; and a melting region in the laser-transmissible resin member is narrow. Further, in order to achieve the excellent welding strength, when the resin members is irradiated with the laser beam having high output power, scorch marks and voids are occurred at a welding part due to excessive heat generation of the laser-absorptive resin member. Thus the welding strength would be rather decreased.

Patent Document 2 discloses another laser welding method. In the method, joining flange parts, which are preliminarily formed as a joint flap for respectively welding laser-transmissible resin member and the laser-absorptive resin member, are butted. In order to temporarily weld the both resin members, irradiation of a laser beam which is radiated from a side of the joining flange part of the laser-transmissible resin member is applied thereto. Then, in order to unify both resin members, essential welding is performed by irradiating the joining flange parts with the laser beam. In this method, the laser-transmissible resin member is also essential in the same as the laser welding method disclosed in Patent Document 1.

The Patent Document 3 discloses another laser welding method. In the method, thermoplastic resin members A and B and a heat-releasing material C having an infrared ray-transmissible part are in contact in order of C/A/B, and then these resin members are irradiated with an infrared ray which is radiated from a side of the heat-releasing material C. According to the method, the thermoplastic members A and B may be made from a same thermoplastic resin. However, in the method, the specific heat-releasing material C must be used in order to adjust the exotherm at the time of laser-welding. Processes in the laser welding method are complex because the heat-releasing material C which is not a member to produce laser welded parts has to be produced for only laser-welding.

PRIOR ART DOCUMENT

Patent Document

[Patent Document 1] Japanese Patent Application Publication No. S62-049850 A

[Patent Document 2] Japanese Patent Application Publication No. 2004-351730 A

[Patent Document 3] International Application Publication No. WO03/039843 A1

SUMMARY OF THE INVENTION

Problems to be Solved by the Invention

In Japanese Patent Application Publication No. 2007-112127 A, the inventors of the present invention proposed achieving a laser welded body having excellent strength by laser-welding a laser-weakly-absorptive resin member which adjusted an absorbance for a specific range by containing nigrosine as a laser beam absorbent and a laser-absorptive resin member containing e.g. nigrosine or nigrosine and carbon black as a laser beam absorbent.

According to the above invention, a melting growth (a molten pool) can be expanded as compared with a conventional laser welding method so that a laser welded body having more excellent tensile strength can be obtained. Further, the above invention has features as follows. Growth of the molten pool is expanded under a laser beam irradiation condition of a low energy amount and a laser beam scan speed at a low speed, and the welding strength of the laser welded body is increased. However, it is difficult to produce a more number of the laser welded body in which resin members are welded so as to have high strength by performing radiation of a laser beam at a high energy amount and a high scan speed, per unit of time.

For example, in a manufacturing line in a factory of automobiles and household appliances, increasing production efficiency at a high manufacturing speed has been one of important problems. Accordingly, a laser welded body obtained by a laser welding method as follows is desired from an industry. A laser welded method can manufacture the laser welded body having excellent welding strength even when radiation of a laser beam is performed at a high scan speed. Further, the laser welded method has high utility which can be introduced into the manufacturing line at a low cost.

The present invention was made in view of solving the above described problems, and its object is to provide a laser welded body which can be manufactured without undergoing complicated steps and maintain the characteristics of a resin contained in a resin member. In addition, the present invention is to provide the laser welded body and method for producing same which exhibits high welding strength even when scanned with a laser beam at a high speed, and which can be manufactured at high production efficiency.

Means for Solving Problems

The inventors of the present invention found out as follows. A melting phenomenon in resin members which is caused by irradiating these with a laser beam is greatly and deeply expanded by employing a single resin member or a plurality of a resin member whose thermal conductivity is increased and an absorbance is adjusted to a specific value so as to transmit a one part of a laser beam while absorbing the other part thereof. Further a melting part is quickly and widely expanded. In the result, the laser welded body of which the resin members are further strongly bonded can be quickly obtained.

A laser welded body of the present invention developed to achieve the objects described above comprises a first resin member which is a laser-irradiated subject, contains a thermoplastic resin and nigrosine sulfate and has an absorbance $a_1$ of 0.09 to 0.9 and a second resin member which contains a thermoplastic resin as the same kind as or different kind from the thermoplastic resin and a laser beam absorbent, and has an absorbance $a_2$ of 3.0 to 15, wherein the first resin member and the second resin member are laser-welded at a part at which the both resin members are overlapped and/or butted.

In the laser welded body, an absorbance ratio $a_2/a_1$ of the absorbance $a_2$ to the absorbance $a_1$ may be 5 to 70.

In the laser welded body, the laser beam absorbent is preferably nigrosine sulfate and/or carbon black.

In the laser welded body, a sulfate ion concentration of the nigrosine sulfate is preferably 0.3 to 5.0% by mass.

In the laser welded body, the carbon black preferably has 12 to 40 nm of a primary particle size, and 150 to 380 $m^2/g$ of a nitrogen adsorption specific surface area.

In the laser welded body, the thermoplastic resin may be at least one selected from the group consisting of a polyamide rein, a polycarbonate resin, a polyphenylene sulfide resin, a polyethylene terephthalate resin, a polybutylene terephthalate resin and a polypropylene resin.

In the laser welded body, the first resin member and/or the second resin member may contain a coloring agent containing anthraquinone.

In the laser welded body, the anthraquinone is preferably an anthraquinone salt-forming dye.

In the laser welded body, the anthraquinone salt-forming dye may be represented by $A^-B^+$ ($A^-$ is an anion from the anthraquinone and $B^+$ is a cation from an organic ammonium compound) or AB (A is a residue of the anthraquinone and B is a residue of an organic ammonium compound).

A method for producing a laser welded body comprises forming a faced part by overlapping and/or butting a first resin member which contains a thermoplastic resin and nigrosine sulfate and has an absorbance $a_1$ of 0.09 to 0.9, and a second resin member which contains a thermoplastic resin as the same kind as or different kind from the thermoplastic resin and a laser beam absorbent and has an absorbance $a_2$ of 3.0 to 15 and melting at least a part of the first resin member and the second resin member at the faced part by irradiating with a laser beam from a side of the first resin member to weld the first resin member and the second resin member. In the method for producing the laser welded body, the first resin member and the second resin member may make face-to-face contact therewith or line contact therewith by combining with planes, curved faces or a plane and a curved face. In combining with these faces, interspace of 0.01 to 0.5 mm may be made between the faces. As one of the features of the present invention, the present invention achieves welding of members having unsuitable shape for welding, which the means of general thermal conduction cannot achieve.

The method for producing the laser welded body may comprise irradiating with the laser beam at a scan speed of 100 to 300 mm/second. The method for producing the laser welded body is applicable to welding at a high scan speed, so that high working efficiency is provided.

Effects of the Invention

According to the laser welded body of the present invention, the laser-weakly-absorptive resin member having both of laser beam transmittivity and laser beam absorbability and the laser-absorptive resin member are laser-welded without a laser-transmissible resin member. Thereby, the laser-weakly-absorptive resin member and the laser-absorptive resin member, which are overlapped and butted, generate heat together by incidence of a laser beam. These resin members are welded so as to exhibit high strength.

In the laser welded body of the present invention, because the laser-weakly-absorptive resin member contains nigrosine sulfate as a laser beam absorbent, the laser-weakly-absorptive resin member exhibits decrease of crystallization temperature, high fluidity and high meltability as compared with a resin member containing nigrosine hydrochloride. Accordingly, the laser welded body is produced with high production efficiency by performing radiation of a laser beam at a high scan speed as compared with a laser welded body employing the resin member containing the nigrosine hydrochloride as a laser beam absorbent.

The laser-weakly-absorptive resin member in the laser welded body generates heat and thermally melts rapidly by receiving the laser beam. A melting object of the laser-weakly-absorptive resin member has the rich fluidity. Thereby even when interspace between the laser-weakly-absorptive resin members which are overlapped and/or butted is formed, the interspace is occluded by forming a wide molten pool (an overall steric shape of the melting object), the laser welded body exhibits high welding strength.

According to the laser welded body, because at least the laser-weakly-absorptive resin member contains the nigrosine sulfate, the molten pool generated at the time of laser beam irradiation grows big without losing the original characteristics of the thermoplastics which are contained to the resin members. Further, the laser welded body has the high welding strength, less variation of the welding strength and an appearance. Unlike the conventional laser welded body, which uses a laser-transmissible resin member and a laser-absorptive resin member, the scorch marks and the voids are not formed at a melted part of the laser welded body.

According to the method for producing the laser welded body, the laser welded body having the both resin members which are strongly welded therebetween are simply produced by reasons as follows. The first resin member which is the laser-irradiated subject exhibits laser-weak absorptivity which refers to a one part of a laser beam while absorbing the other part thereof because the first resin member has 0.09 to 0.9 of the absorbance $a_1$. Thereby, not only the second resin member having higher absorbance $a_2$ but also the first resin member generate heat and melt by irradiating with the laser beam.

MODE FOR CARRYING OUT THE INVENTION

Hereunder, embodiments to practice the present invention will be explained in detail, but the scope of the present invention is not restricted by these embodiments. Incidentally in the present description, the term "to" is used as referring to include values sandwiching it as an upper limit and a lower limit.

In a laser welded body of the present invention, at least first resin member is a laser-weakly-absorptive resin member containing nigrosine sulfate and having both of laser beam transmittivity and laser beam absorbability. A second resin member is a laser-absorptive resin member containing a laser beam absorbent and having the laser beam absorbability. The laser-weakly-absorptive resin member and the laser-absorptive resin member in the laser welded body are welded so as to exhibit high strength by absorbing at least in part of the laser beam entering thereto, generating heat, melting and solidifying. The laser-weakly-absorptive resin member and the laser-absorptive resin member may be a member having a flat plate shape or a single film shape and may be a single member or a plurality of a member which is curved or bent into a roll shape, a cylindrical shape, a prismatic shape or a box shape, respectively. At a part should be welded in the both resin members, these resin members may contact each other and may have interspace therebetween. When the both resin members contact each other, the part should be welded is preferably face-to-face contact and may be combination with planes, curved faces or a plane face and a curved face.

Figure 1A:
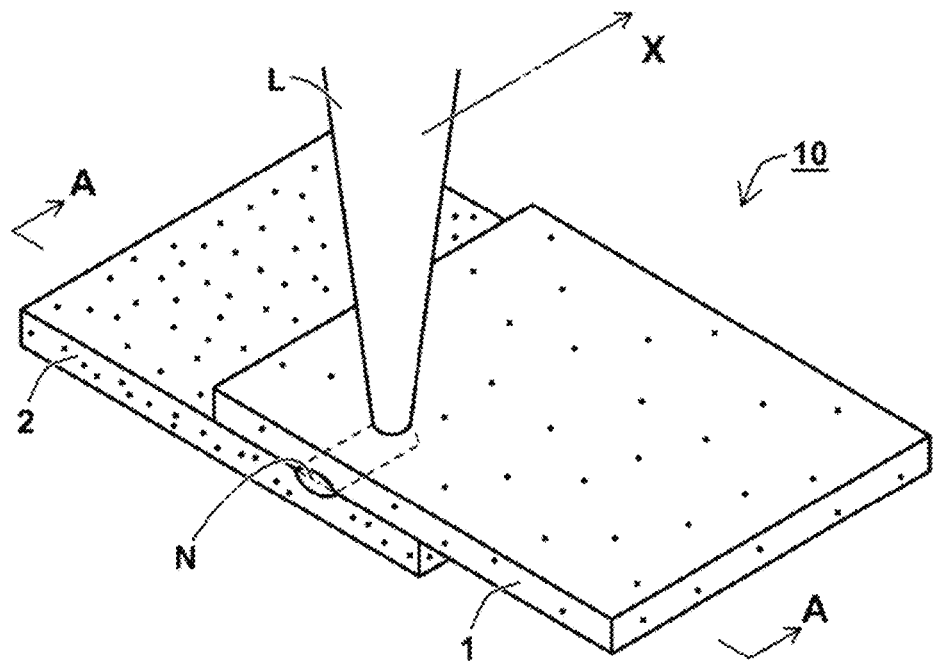
FIGS. 1(a) and 1(b) are a perspective view and a partially schematic cross sectional view taken along A-A line showing a scene from preparing a laser welded body to which the present invention is applied.
Figure 1B:
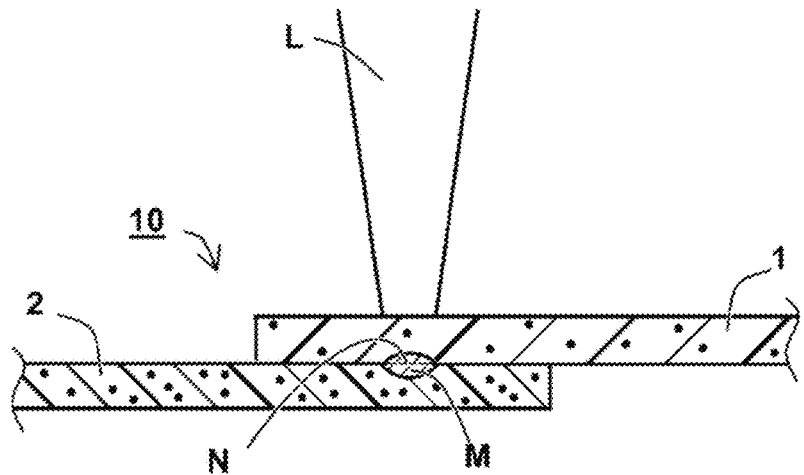

A perspective view showing a scene from producing the laser welded body of the present invention is shown in FIG. 1(a), and a partially schematic cross sectional view taken along A-A line is shown in FIG. 1(b). A laser welded body 10 is an integration of a plurality of a resin member by laser-welding and bonding. In the laser welded body 10, a laser-weakly-absorptive resin member 1 as the first resin member located on an upper side and a laser-absorptive resin member 2 as the second resin member located on a lower side are offset and overlapped so as to form difference in level, overlapped and contacted each other. The laser-weakly-absorptive resin member 1 is a laser-irradiated subject. The laser-weakly-absorptive resin member 1 and the laser-absorptive resin member 2 are laser-welded at a part of an overlapped interface. The overlapped interface is a contacted part N which is a faced part formed by contact of the both resin members 1, 2. The laser welded body 10 has a welded part M at the contacted part N. The welded part M is expanded so as to bridge the laser-weakly-absorptive resin member 1 and the laser-absorptive resin member 2. The welded part M is formed by cooling and solidifying of a part of the both resin members which are melted by an incident laser beam L.

The both resin members 1, 2 have a flat and square plate shape having a uniform thickness. The laser-weakly-absorptive resin member 1 contains nigrosine sulfate as the laser beam absorbent and a thermoplastic resin. Thereby the laser-weakly-absorptive resin member 1 absorbs a one part of the laser beam L and transmits the other part thereof. The laser-absorptive resin member 2 contains a thermoplastic resin, preferably contains the nigrosine sulfate as the laser beam absorbent, and absorbs the laser beam L which transmits through the laser-weakly-absorptive resin member 1. The laser-weakly-absorptive resin member 1 as the subject for irradiating with a laser beam is located on a radiation side of the laser beam L. Radiation of the laser beam L is performed at an approximately vertical angle relative to an irradiation face of the laser-weakly-absorptive resin member 1. The laser beam L scans the irradiation face toward an X direction in a straight line. In the laser welded body 10, the both resin members 1, 2 are integrated by being welded at the contacted part N in the straight line.

An absorbance $a_1$ of the laser-weakly-absorptive resin member 1 is preferably 0.09 to 0.9, more preferably 0.1 to 0.7 and even more preferably 0.1 to 0.5 relative to a laser beam having 940 nm of a wavelength range which is output from a semiconductor laser. An absorbance $a_2$ of the laser-absorptive resin member 2 is preferably 3.0 to 15, more preferably 3.0 to 13 and even more preferably 5.0 to 12 relative to the laser beam of the same as above. When the both resin members 1, 2 are overlapped, a sufficient energy amount are needed to be applied into the both resin members 1, 2, in order to generate thermal melting at the contacted part N which is the overlapped interface thereof by irradiating with the laser beam L. Especially, when the laser welded body is produced at high efficiency, a scan speed of the laser beam L is set to a high speed, e.g. 100 to 300 mm/second. In order to weld the both resin members 1, 2 so as to achieve the high strength under a condition of the scan speed at the high speed, it is preferable to prevent an exothermic amount of the resin members from being too much or too little by adjusting an energy amount of the laser beam L. Thereby dents, scorch marks and voids in the both resin members 1, 2 are prevented. Further, thermal conduction and thermal radiation by vertical growing a melting part at the contacted part N are accelerated. The resin members 1, 2 are welded and more strongly bonded. The resin members 1, 2 are bonded while having the excellent strength due to values of the absorbance $a_1$ and the absorbance $a_2$ ranged in the above, even when the scan speed of the laser beam L is high. Incidentally, when the resin members 1, 2 are overlapped, transmittance and absorbance thereof are emphasized.

As the values of the absorbance $a_1$ and the absorbance $a_2$ are ranged in the above, the both resin members 1, 2 accomplish both of exotherm characteristics required for welding these and preventing excessive exotherm by energy concentration of the incident laser beam L. Further, both of the laser-weakly-absorptive resin member 1 which is the subject adapted to be irradiated with the laser beam and the laser-absorptive resin member 2 which is not directly irradiated with the laser beam sufficiently generate heat and melt. Furthermore even when the both resin members 1, 2 have different thicknesses each other, these are tenaciously welded, so that the laser welded body having a complex shape is produced. In this method for producing the laser welded body, the laser-weakly-absorptive resin member 1 (the first resin member) and the laser-absorptive resin member 2 (the second resin member) may contact with face-to-face by the combination of planes, curved faces or a plane and a curved face. In the combination of these faces, the interspace of 0.01 to 0.5 mm may be made between the faces.

A ratio of the absorbance $a_2$ to the absorbance $a_1$, that is, the absorbance ratio $a_2/a_1$ is preferably 5 to 70, more preferably 7 to 67 and even more preferably 10 to 67. As the absorbance $a_2/a_1$ ratio is ranged therein, exotherm amounts of the both resin members are not greatly different each other. This point is different from a conventional laser welded body using a laser-absorptive resin member excessively absorbing a laser beam and a laser-transmissible resin member insufficiently generating heat by irradiating with a laser beam due to laser beam transmittivity. According to the laser welded body 10 of the present invention, even when the laser beam L with low energy is used, a great deal of welding strength is achieved as compared with the conventional laser welded body.

In the both resin members 1, 2, at least the laser-weakly-absorptive resin member 1 has a low crystallization temperature due to containing the nigrosine sulfate as compared with a resin member not containing it. The laser-weakly-absorptive resin member 1, which is melted by the incident laser beam L, exhibits rich fluidity. Therefore even when the interspace due to surface roughness of the resin members 1, 2 is existed, the thermally melted laser-weakly-absorptive resin member 1 is flowed into the interspace and thus, the interspace is filled. In the result, the resin members 1, 2 are strongly welded. A melt flow rate (in accordance with Japanese Industrial Standard K7210: 2014) of the laser-weakly-absorptive resin member 1 is preferably 10 to 50 g/10 minutes, more preferably 11 to 30 g/10 minutes, even more preferably 12 to 20 g/10 minutes and still even more preferably 13 to 18 g/10 minutes.

Color tone of the resin members 1, 2 are preferably a deep color, especially black color tone. For example, it is preferable to contain a coloring agent containing anthraquinone in thermoplastic resin composition which is a raw material of the resin members 1, 2. A preferred content of the coloring agent added thereinto is appropriately adjusted.

The method for producing the laser welded body of the present invention comprises overlapping the laser-weakly-absorptive resin member 1 and the laser-absorptive resin member 2; and irradiating the laser-weakly-absorptive resin member 1 with the laser beam from a side of the laser-weakly-absorptive resin member 1 toward a face thereof to weld at least a part of the both resin members 1, 2; whereby these resin members are welded. According to the method for producing the laser welded body of the present invention, the laser welded body having the high strength is obtained at the high efficiency by scanning with the laser beam at a high scan speed such as 50 to 300 mm/second and preferably 100 to 300 mm/second because the laser-weakly-absorptive resin member 1 containing the nigrosine sulfate as the laser beam absorbent and the laser-absorptive resin member 2 preferably containing the nigrosine sulfate as the laser beam absorbent have the low crystallization temperature. Processes for producing the laser welded body 10 comprises, for example, following steps from A to D.

Step A: A laser-weakly-absorptive resin composition for molding the laser-weakly-absorptive resin member 1 is prepared. The laser-weakly-absorptive resin composition contains the thermoplastic resin and the nigrosine sulfate as the laser beam absorbent and may optionally contain coloring agents and additives. On the basis of an essential absorbance of the thermoplastic resin, nigrosine sulfate content is adjusted so that the absorbance $a_1$ is ranged from 0.09 to 0.9 as above. The laser-weakly-absorptive resin member 1 having a shape e.g. a square plate shape is molded by using a molding machine. The laser-weakly-absorptive resin member 1 may be molded through the step of powder-blending multiple kinds of the laser-weakly-absorptive resin composition containing the thermoplastic resin and the laser beam absorbent and optionally containing the coloring agents, and the additives and the step of preparing a masterbatch by performing an extrusion molding of the laser-weakly-absorptive resin composition. The laser-weakly-absorptive resin member 1 contains the nigrosine sulfate as the laser beam absorbent. In addition to this, following laser beam absorbents may be further contained therein, as needed.

As nigrosine, black azine-based condensation mixtures described in Color Index as C.I. Solvent Black 5 and C.I. Solvent Black 7 are exemplified. The nigrosine is synthesized through dehydrating and condensing, and oxidizing e.g. aniline, aniline hydrochloride and nitrobenzene at 160 to 180° C. of a reaction temperature in the presence of iron chloride. In the view of increasing the fluidity of the thermoplastic rein, C.I. Solvent Black 5 is more preferable.

According to production reaction system of the nigrosine employing the iron chloride as a catalyst, because the reaction proceeds in the presence of the iron chloride and/or excessive hydrochloride, nigrosine hydrochloride is produced. A method for producing the nigrosine sulfate from the nigrosine hydrochloride is not restricted as long as entire chloride ion or corresponded parts thereof are replaced with sulfate ions, a known reaction method may be used. Incidentally, the nigrosine sulfate is not a water soluble black dye belonging to C.I. Acid Black 2 but an oil soluble black dye belonging to C.I. Solvent Black 5.

A method for producing the nigrosine sulfate includes, specifically, for example, dispersing the nigrosine into dilute sulfuric acid and appropriately heating it (e.g. 50 to 90° C.). In addition, for example, the nigrosine sulfate may be produced through the steps of dispersing a condensation reaction solution obtained by producing nigrosine into dilute sulfuric acid and the steps of appropriately heating it (e.g. 50 to 90° C.). Furthermore, for example, the nigrosine sulfate may be produced through the steps of dissolving nigrosine in concentrated sulfuric acid while maintaining a temperature of a reaction solution at a low temperature to prevent sulfonation and the steps of adding the resultant solution into a large amount of ice water to deposit a crystal. Additionally, a wash step, a purification step and a dry step may be performed.

With regard to the nigrosine sulfate, as a sulfate ion concentration is 0.3 to 5.0% by mass, preferably 0.5 to 3.5% by mass, the crystallization temperature of the thermoplastic resin is greatly decreased. Thereby a laser-welding process may be simply and stably performed. The sulfate ion concentration in the nigrosine sulfate is measured through instrumental analysis by using ion chromatography after extracting the sulfate ions from a sample of the nigrosine. In the producing processes for the nigrosine sulfate, since impurities, inorganic salts and the like in a raw nigrosine sulfate are removed, insulation of the nigrosine sulfate is increased. Accordingly, this nigrosine sulfate is preferably used for materials of articles, which require the insulation with an emphasis, such as electrical parts and electronic parts etc. as compared with resin materials containing carbon black.

Volume resistivity of the nigrosine sulfate is $1.0 \times 10^9$ $\Omega \cdot cm$ or more, preferably $5.0 \times 10^9$ to $7.0 \times 10^{11}$ $\Omega \cdot cm$, more preferably $8.0 \times 10^9$ to $1.0 \times 10^{11}$ $\Omega \cdot cm$ and even more $1.0 \times 10^{10}$ to $1.0 \times 10^{11}$ $\Omega \cdot cm$. Materials containing the nigrosine sulfate exhibiting the high volume resistivity are preferably used in parts requiring the high insulation such as the electrical parts and the electronic parts. Hence the materials containing the nigrosine sulfate may be extensively applied to an industry. The volume resistivity of the nigrosine sulfate is obtained as follows. A sample is prepared by measuring an amount of the nigrosine sulfate. The sample is solidified by loading 200 kgf. A volume of the sample is measured. The volume resistivity of the sample is measured by using a digital ultrahigh resistance/microcurrent ampere meter (manufactured by ADC CORPORATION, tradename: 8340A).

A nigrosine sulfate content in the laser-weakly-absorptive resin member 1 is 0.01 to 0.3% by mass, preferably 0.01 to 0.2% by mass. When the content is less than 0.01% by mass, the absorbance $a_1$ is less than the above lower limit. In a result, increasing of temperature is insufficient because the exotherm amount of the laser-weakly-absorptive resin member 1 absorbing a part of energy of the laser beam is too little. Welding in a butting part B and the contacted part N is deficient and thus, the both resin members 1, 2 are poor in bonding strength. In contrast, when the content is higher than 0.3% by mass, the absorbance $a_1$ is higher than the above upper limit. In a result, because a laser beam transmittance of the laser-weakly-absorptive resin member 1 as the laser-irradiated subject is significantly decreased, only the laser-weakly-absorptive resin member 1 excessively absorbs the energy, generates heat and melts. The both resin members 1, 2 are not rigidly welded and thus, the high bonding strength is not achieved. When the laser-irradiated subject located on an entering side of the laser beam excessively absorbs the energy of the laser beam, resin characteristics such as physical and chemical characteristics coming from the material thereof is easily lost.

Step B: A laser-absorptive resin composition for molding the laser-absorptive resin member 2 is prepared. The laser-absorptive resin composition contains the thermoplastic rein, and the nigrosine sulfate and/or following laser beam absorbents as the laser beam absorbent. As needed, the laser-absorptive resin composition may contain coloring agents and additives. On the basis of an essential absorbance of the thermoplastic resin, a content of the laser beam absorbent such as the nigrosine sulfate and the carbon black is adjusted so that the absorbance $a_2$ is ranged from 3.0 to 15 as above. The laser-absorptive resin member 2 having a shape e.g. a square plate shape is molded by using a molding machine. The laser-absorptive resin member 2 may be molded through the step of powder-blending multiple kinds of the laser-absorptive resin composition containing the thermoplastic rein and the laser beam absorbent and optionally containing the coloring agents and the additives and the step of preparing a masterbatch by performing an extrusion molding of the laser-absorptive resin composition. The laser beam absorbent content in the laser-absorptive resin member 2 is 0.1 to 5.0% by mass and preferably 0.3 to 3.0% by mass.

As the laser beam absorbent contained in the laser-absorptive resin member 2, aniline black, a mixture of nigrosine and carbon black, carbon black, phthalocyanine, naphthalocyanine, porphyrin, cyanine-based compounds, perylene, quaterrylene, azo metal complexes, oxocarbon derivatives (e.g. squarylium derivatives, croconium derivatives and the like), oxime metal complexes, dithiolene metal complexes, dithiol metal complexes, aminothiophenolate metal complexes, naphthoquinone compounds, diimmonium dye, benzodifranone compounds, carbon black and the like are included besides nigrosine and a salt thereof (preferably nigrosine sulfate).

In addition, as an inorganic laser beam absorbent, known oxides, hydroxides, sulfides, sulfates and phosphates of one metal or combined two or more metals selected from the group consisting of copper, bismuth, aluminum, zinc, silver, titanium, antimony, manganese, iron, nickel, chromium, barium, gallium, germanium, cesium and tungsten are exemplified. As the preferred inorganic laser beam absorbent, bismuth pigments (e.g. $Bi_2O_3$, $BiOCl$, $BiONO_3$, $Bi(NO_3)_3$, $Bi_2O_2CO_3$, $BiOOH$, $BiOF$ and the like), molybdate derivatives (e.g. tungsten molybdate, zinc molybdate, ammonium molybdate, sodium molybdate and the like), tungstate derivatives (e.g. zinc tungstate, ammonium tungstate, sodium tungstate, iron tungstate, cesium tungstate and the like), tungsten oxides (e.g. $Rb_{0.33}WO_3$, $Cs_{0.20}WO_3$, $Cs_{0.33}WO_3$, $Tl_{0.33}WO_3$, $K_{0.33}WO_3$, $Ba_{0.33}WO_3$ and the like), nitride compounds (titanium nitride, zirconium nitride the like), copper hydroxide phosphate and copper phosphate are exemplified.

In regard to the carbon black, a production method thereof, kind of a raw material thereof and the like are not restricted, and any carbon black which are conventionally known are used. For example, any of furnace black, channel black, acetylene black, ketjen black and the like may be used. Among them, furnace black is preferable on the point of a coloring property and a cost. A primary particle size of carbon black is appropriately selected, and is preferably 12 to 60 nm, more preferably 12 to 40 nm and even more preferably 12 to 22 nm. When the primary particle size of carbon black is 12 nm or more, the fluidity tends to be increased. When the primary particle size thereof is 60 nm or less, a jet-black degree of a molded body is increased.

Generally, a carbon black having less than 500 m$^2$/g of a nitrogen adsorption specific surface area may be used. Among them, the nitrogen adsorption specific surface area is preferably 50 to 400 m$^2$/g, more preferably 120 to 380 m$^2$/g and even more preferably 150 to 350 m$^2$/g. When the nitrogen adsorption specific surface area is less than 500 m$^2$/g, the fluidity of a resin composition for molding the laser-absorption resin member 2 and an appearance of the laser-absorption resin member 2 which is the molded body tend to be excellent. The nitrogen adsorption specific surface area is measured in accordance with Japanese Industrial Standard K 6217, specifically, K 6217-2 (2001). A DBP (Dibutyl phthalate) absorption of carbon black is preferably less than 300 cm$^3$/100 g, especially, preferably 30 to 200 cm$^3$/100 g. When the DBP (Dibutyl phthalate) absorption is less than 300 cm$^3$/100 g, the fluidity of the resin composition and the appearance of the molded body tend to be excellent. The DBP (Dibutyl phthalate) absorption is measured in accordance with Japanese Industrial Standard K 6217, specifically, K 6217-4 (2017). A of carbon black content in the laser-absorption resin member 2 is 0.1 to 1.5% by mass and preferably 0.2 to 1.0% by mass. As the preferred laser beam absorbent, the nigrosine and the salt thereof (nigrosine sulfate), and/or carbon black (preferably carbon black having 12 to 40 nm of the primary particle size and 150 to 380 m$^2$/g of the nitrogen adsorption specific surface area, and more preferably carbon black having 12 to 22 nm of the primary particle size and 150 to 330 m$^2$/g of the nitrogen adsorption specific surface area) are exemplified.

Step C: The both rein members 1, 2 are overlapped and contacted each other to form the contacted part N. Hereat the both resin members 1, 2 may be fixed by compressing after clamping those by a jig. Furthermore, an anti-reflection member such as a glass plate, an anti-reflection film or a transmissible member such as a glass plate, which does not shield and not damp the laser beam L, may be used. The anti-reflection member and the transmissible member may be placed on a laser-incident face of the first laser-weakly-absorptive resin member 1 as the subject for irradiating with the laser beam. The laser beam L enters into the face thereof.

Step D: The laser beam L set to a specific condition is radiated from the side of the laser-weakly-absorptive resin member 1 while moving toward the X direction so as to reach the laser-absorptive resin member 2 through the contacted part N. First, the laser beam L enters into the laser-weakly-absorptive resin member 1. A part of the laser beam L transmits the laser-weakly-absorptive resin member 1. The other part thereof is absorbed into the laser-weakly-absorptive resin member 1 and generates heat thereto. In the laser-weakly-absorptive resin member 1, a part which has absorbed the laser beam L generates heat. The laser beam L which transmits the laser-weakly-absorptive resin member 1 enters into the laser-absorptive resin member 2 through the contacted part N and is absorbed. In the laser-absorptive resin member 2, the contacted part N first generates melting. The melting grows toward the opposite face of the face which has received the laser beam L. In the result, a molten pool is formed into a part of the both resin members 1, 2 as if a liquid resin in a molten state has been accumulated. The laser-weakly-absorptive resin member 1 has laser beam transmittivity. The transmittance of the laser-weakly-absorptive resin member 1 is 7% or more, preferably 10 to 80% and more preferably 15 to 70%.

When the both resin members 1, 2 contain nigrosine sulfate, the low crystallization temperature and the high fluidity is exhibited thereby. The both resin member 1, 2 quickly melt by the laser beam L entering thereto and thus, the molten pool is formed. Accordingly, the scan speed of the laser beam L is even higher than a conventional laser welding method. The laser welded body 10 is produced with extremely high production efficiency.

The heat of the molten pool slightly radiates and conducts to a vertical direction with respect to an entering direction of the laser beam L. Thereby the molten pool is grown. The molten pool is expanded to the both resin members 1, 2 through a part of the contacting N. When the molten pool is cooled, a molten part of the both resin member 1, 2 is solidified. Consequently, the welded part M which is expanded while bridging the both resin members 1, 2 is formed. The both resin members 1, 2 are strongly bonded at the contacted part N which is welded. The laser welded body 10 is obtained.

In the step D, a cooling treatment of blowing air and/or inert gas on the face into which the laser beam L enters may be performed. When gas is generated from the both resin members 1, 2 due to laser-welding, the gas may be cleaned by using a gas treatment apparatus.

Another embodiment of the laser welded body 10 employing the laser-weakly-absorptive resin member 1 and the laser-absorptive resin member 2 will be explained while referring to FIGS. 2(a), 2(b), and 3. The absorbance $a_1$ of the laser-weakly-absorptive resin member 1 and the absorbance $a_2$ of the laser-absorptive resin member 2 have the values in the same ranges as above.

Figure 2A:
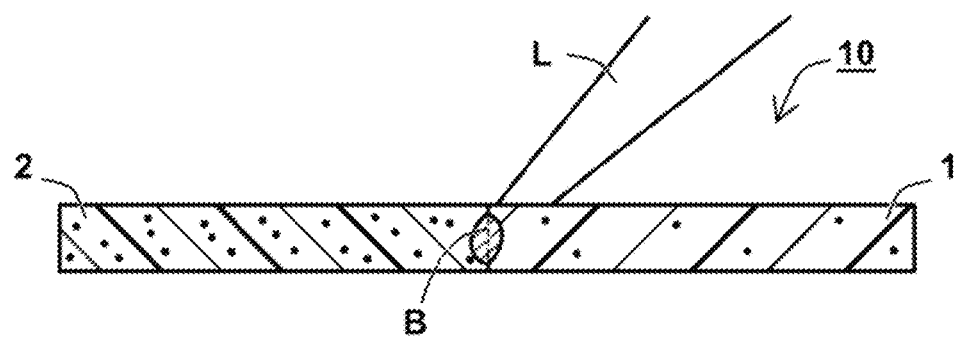
FIGS. 2(a)-2(d) are schematic cross sectional views showing a scene from preparing another laser welded body to which the present invention is applied.
Figure 3:
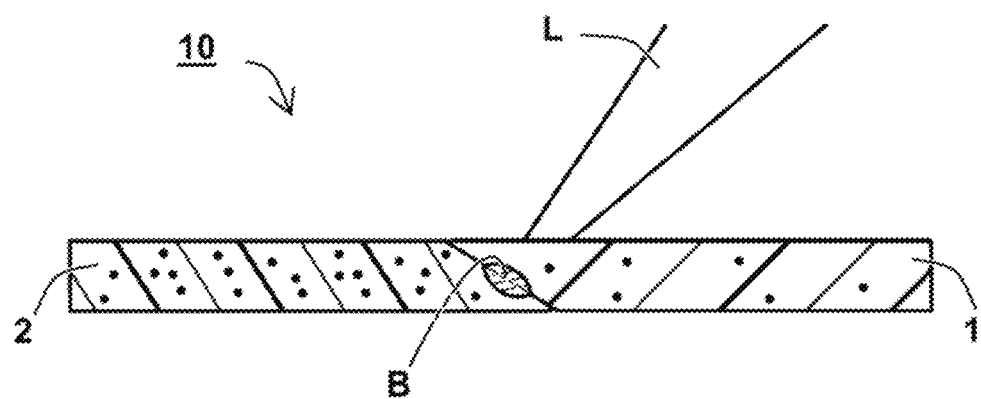
FIG. 3 is a schematic cross sectional view showing a scene from preparing another laser welded body to which the present invention is applied.

FIG. 2(a) is a schematic cross sectional view showing a scene when preparing another laser welded body 10. The both absorbance $a_1$, $a_2$ of the resin members 1, 2 have the values in the same ranges as above. The laser welded body 10 has a butted part B. An edge part of the laser-weakly-absorptive resin member 1 which is the subject adapted to be irradiated with the laser beam and an edge part of the laser-absorptive resin member 2 are contacted and butted each other. Thereby the butted part B as the faced part is formed. Irradiation of the laser beam L which aims from the side of the laser-weakly-absorptive resin member 1 toward the butted part B is applied onto the upper face of the laser-weakly-absorptive resin member 1 at a tilted angle relative to the upper face thereof. A one part of the laser beam L is absorbed into the laser-weakly-absorptive resin member 1. The other part of the laser beam L transmits the laser-weakly-absorptive resin member 1, reaches the edge part of the laser-absorptive resin member 2 which is butted, and absorbed thereinto. The both resin members 1, 2 generate heat and melt at the butted part B. Accordingly, the both resin members 1, 2 are welded at the butted part B and integrated and thus, the laser welded body 10 is formed.

Figure 2B:
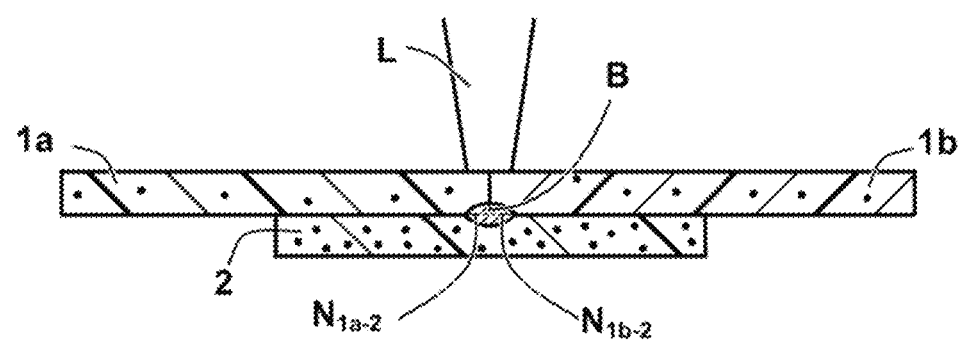

FIG. 2(b) is a schematic cross sectional view showing a scene when preparing another laser welded body 10. The laser-weakly-absorptive resin member 1 which is the subject adapted to be irradiated with the laser beam is divided into a first laser-weakly-absorptive resin member piece 1a and a second laser-weakly-absorptive resin member piece 1b. By overlapping the both resin member 1, 2, a contacted part $N_{1a-2}$ of the first laser-weakly-absorptive resin member piece 1a is formed, and the laser-absorptive resin member 2 and a contacted part $N_{1b-2}$ of the second laser-weakly-absorptive resin member piece 1b and the laser-absorptive resin member 2 is formed. The edge parts of each laser-weakly-absorptive resin member piece 1a, 1b are butted and contacted. The butted part B in the laser welded body 10 is vertically formed with respect to the contacted parts $N_{1a-2}$, $N_{1b-2}$. The both laser-weakly-absorptive resin member pieces 1a, 1b and the laser-absorptive resin member 2 have a same external size and an external shape. The laser-weakly-absorptive resin member 1 is projected from both edges of the laser-absorptive resin member 2. An absorbance $a_{1-1}$ of the first laser-weakly-absorptive resin member piece 1a and an absorbance $a_{1-2}$ of the second laser-weakly-absorptive resin member piece 1b may be the same or different as long as these are ranged within 0.09 to 0.9 which is the absorbance $a_1$ of the laser-weakly-absorptive resin member 1. The absorbance $a_2$ of the laser-absorptive resin member 2 is 3.0 to 15 in the same as above. Radiation of the laser beam L which aims from directly above the butted part B toward it is performed. The both laser-weakly-absorptive resin member pieces 1a, 1b are welded at the butted part B, and further the laser-weakly-absorptive resin member 1 and the laser-absorptive resin member 2 are welded at the contacted parts $N_{1a-2}$, $N_{1b-2}$. Consequently, the laser welded body 10 which is welded at the butted part B and the contacted parts $N_{1a-2}$, $N_{1b-2}$ is formed.

Figure 2C:
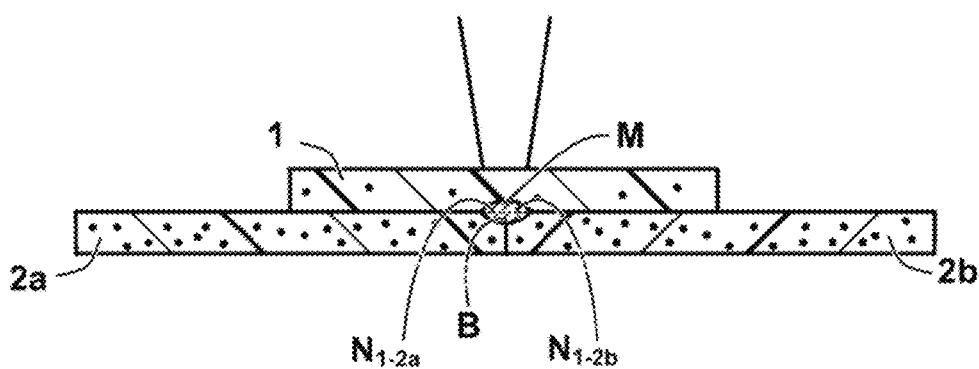

FIG. 2(c) is a schematic cross sectional view showing a scene when preparing another laser welded body 10. The laser-weakly-absorptive resin member 1 which is the subject adapted to be irradiated with the laser beam is located on an upper side, and the laser-absorptive resin member 2 is located on a lower side. The laser-absorptive resin member 2 is divided into a first laser-absorptive resin member piece 2a and a second laser-absorptive resin member piece 2b. By overlapping the both resin member 1, 2, a contacted part $N_{1-2a}$ of the laser-weakly-absorptive resin member 1 and the first laser-absorptive resin member piece 2a is formed, and a contacted part $N_{1-2b}$ of the laser-weakly-absorptive resin member 1 and the second laser-absorptive resin member piece 2b is formed. The edge parts of each laser-absorptive resin member piece 2a, 2b are butted and contacted. The butted part B in the laser welded body 10 is vertically formed with respect to the contacted parts $N_{1-2a}$, $N_{1-2b}$. The laser-weakly-absorptive resin member 1 and the both laser-absorptive resin member pieces 2a, 2b have a same external size and an external shape. The laser-absorptive resin member 2 is projected from both edges of the laser-weakly-absorptive resin member 1. The absorbance $a_1$ of the laser-weakly-absorptive resin member 1 is 0.09 to 0.9 in the same as above. An absorbance $a_{2-1}$ of the first laser-absorptive resin member piece 2a and an absorbance $a_{2-2}$ of the second laser-absorptive resin member piece 2b may be the same or different as long as these are ranged within 3.0 to 15 which is the absorbance $a_2$ of the laser-absorptive resin member 2. The radiation of the laser beam L which aims from the side of the laser-weakly-absorptive resin member toward the butted part B is performed. The laser-weakly-absorptive resin member 1 melts at a part into which the laser beam L enters, and the laser-absorptive resin member 2 melts at the butted part B. In the result, the laser-weakly-absorptive resin member 1 and the both laser-absorptive resin member pieces 2a, 2b are welded at the contacted parts $N_{1-2a}$, $N_{1-2b}$. The both laser-absorptive resin member pieces 2a, 2b are welded at the butted part B. The welded part M of the laser welded body 10 is formed so as to expand between the contacted parts $N_{1-2a}$, $N_{1-2b}$ and the butted part B. Consequently, the laser welded body 10 which is welded at the butted part B and the contacted parts N is formed.

Figure 2D:
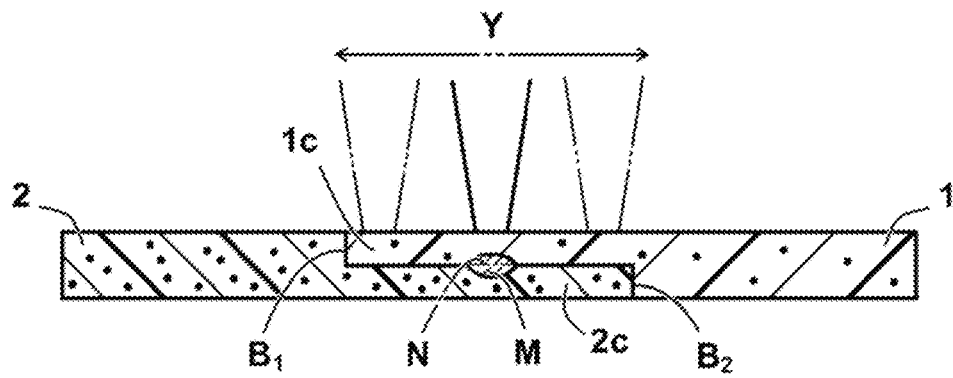

FIG. 2(d) is a schematic cross sectional view showing a scene when preparing another laser welded body 10. The laser-weakly-absorptive resin member 1 having a square shape has a first margin part 1c at the side thereof. The laser-absorptive resin member 2 having a square shape has a second margin part 2c at the side thereof. The both margin parts 1c, 2c have a stepped profile having a same height, respectively. The both margin parts 1c, 2c are faced and alternately fitted together. Thereby the contacting part N by overlapping the both resin members 1, 2 and an upper butted part $B_1$ and a lower butted part $B_2$ by butting the edges thereof are formed. In the contacting part N, the first margin part 1c is located on the entering side of the laser beam L. The laser-weakly-absorptive resin member 1 and the laser-absorptive resin member 2 are welded at the contacting part N and integrated by the radiation of the laser beam L from a side of the first margin part 1c. Incidentally, as shown by a two-dot chain in FIG. 2(d), the laser beam L may scan the face of the first margin part 1c of the laser-weakly-absorptive resin member 1 while taking along the X direction (refer to FIG. 1(a) and a depth direction in FIG. 2(d)) and in a Y direction (a horizontal direction in FIG. 2(d)) which is a vertical direction with respect thereto. The both resin members 1, 2 are widely welded at the contacting part N and also welded at the both butted part $B_1$, $B_2$. Because the welded part M is broadly formed, the welding strength between the both resin members 1, 2 may be further increased.

The butted part B of the laser welded body 10 may be formed at an angle with respect to the laser-irradiated face of the laser-weakly-absorptive resin member 1. In the laser welded body 10 shown in FIG. 3, edges of the laser-weakly-absorptive resin member 1 and the laser-absorptive resin member 2 respectively have an angled face having a same angle with respect to the face therefor. The edges of the both resin members 1, 2 formed so as to have the angled face are alternately butted so that a sharply angled side of the angled edge is located on the laser-irradiated face (an upper face in FIG. 3) of the laser-weakly-absorptive resin member 1. Thereby the angled-butted part B is formed. The radiation of the laser beam L is approximately and vertically performed relative to the angled-butted part B. The both resin member 1, 2 in the laser welded body 10 are strongly bonded because the welded part M is broadly formed at the angled-butted part B. Incidentally, the radiation of the laser beam L may be approximately and vertically performed relative to the laser-irradiated face of the laser-weakly-absorptive resin member 1 and may be performed at an angle relative to the angled-butted part B.

Figure 4:
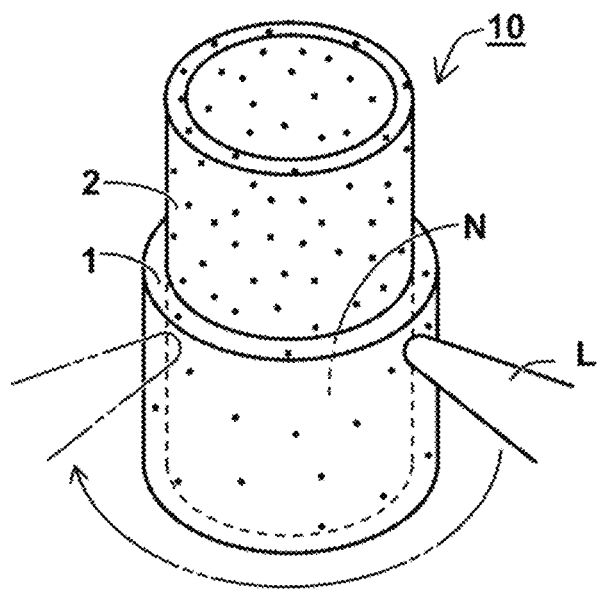
FIG. 4 is a perspective view showing a scene from preparing another laser welded body to which the present invention is applied.

FIG. 4 is a schematic cross sectional view showing a scene when preparing another laser welded body 10. The laser welded body 10 may have a cylindrical shape. The laser-weakly-absorptive resin member 1 and the laser-absorptive resin member 2 have the cylindrical shape having an opening at two ends. An inner diameter of the laser-weakly-absorptive resin member 1 is somewhat larger than an outer diameter of the laser-absorptive resin member 2. The laser-absorptive resin member 2 is inserted into a cavity of the laser-weakly-absorptive resin member 1 so as to have play to allow the laser-absorptive resin member 2 to be removed from and inserted into the laser-weakly-absorptive resin member 1. An inner circumferential face of the laser-weakly-absorptive resin member 1 and an outer circumferential face of the laser-absorptive resin member 2 are contacted while partially having a slight interspace. Thereby the contacting part N is formed. Length of the laser-weakly-absorptive resin member 1 is shorter than that of the laser-absorptive resin member 2. The laser-absorptive resin member 2 is projected from the opened end of the laser-weakly-absorptive resin member 1. The laser beam L is aimed at the laser-weakly-absorptive resin member 1 so as to go around the outer circumferential face thereof. The both resin member 1, 2 are welded at the contacting part N and thus, the laser welded body 10 is formed.

As the laser beam L, it is preferable that the infrared ray ranging from 800 to 1600 nm that is a longer wavelength as compared with visible radiation, preferably, an oscillation wavelength ranging from 800 to 1100 nm may be used. Examples of the laser beam are a solid laser (Nd: yttrium aluminum garnet (YAG) excitation and/or semiconductor laser excitation), a semiconductor laser, a tunable diode laser, a titanium-sapphire laser (Nd: YAG excitation) are preferably used. For other examples, a halogen lamp or a xenon lamp that generate the infrared ray having the wavelength of 700 nm or more may be used. In addition, the radiation of the laser beam L may be vertically performed and may be performed at an angle relative to the face of the subject adapted to be irradiated with the laser beam, and may be performed at a single direction or multiple directions. Output power of the laser beam L is adjusted corresponding to the scan speed and the absorbances $a_1$, $a_2$ of the each resin members 1, 2. The output power is preferably 10 to 500 W and more preferably 30 to 300 W.

When the halogen lamp generating the infrared ray having wavelength of 700 nm or more is used, for example, halogen lamps which are arranged to a band-shape are exemplified. Examples of a laser radiation procedure are a scanning type in which the radiation of the laser beam may be broadly performed by moving the lamp; a masking type in which the resin members which should be welded move; and a simultaneous radiation type that the lamps simultaneously illuminate the resin members which should be welded from multiple directions. Some conditions such as a radiation width, a radiation time and radiation energy of the infrared ray can be adjusted properly. The halogen lamp has an energy distribution centering on near infrared region, so the energy exist at a shorter wavelength side of the energy distribution, that is to say a visible region. In such a case, the energy of the visible region may be shielded using a cut-off filter because welding scars may be made on the surface of the resin member which is irradiated with the ray.

An absorption coefficient $\varepsilon_d$ (ml/g·cm) of the laser beam absorbent such as the nigrosine sulfate is 1000 to 8000 (ml/g·cm), preferably 1000 to 6000 (ml/g·cm), more preferably 3000 to 6000 (ml/g·cm). A measuring procedure of the absorption coefficient (absorptivity) $\varepsilon_d$ as follows. The laser beam absorbent in an amount of 0.05 g of is precisely weighed and is dissolved into solvent such as N, N-dimethylformamide (DMF) by using a 50 ml type measuring flask. By using a 50 ml type measuring flask, 1 ml of the resultant solution is diluted with DMF. A measuring sample is prepared. Then the absorbance of the measuring sample is measured by using a spectrophotometer (manufactured from Shimadzu Corporation, tradename: UV1600PC).

A thickness of the both resin members 1, 2 is preferably 200 to 5000 µm and more preferably 500 to 4000 respectively. Especially, the thickness of the laser-weakly-absorptive resin member 1 is preferably 700 to 3500 µm and more preferably 800 to 3000 µm because the laser beam transmits the laser-weakly-absorptive resin member 1. When the thickness is less than 200 control of the energy of the laser beam is difficult. When too much or too little melting is occurred at the time of laser-welding, a break is occurred by excessive heat, or the bonding strength is insufficiently obtained by too little heat. In contrast, when the thickness is thicker than 5000 µm, a distance to the portion should be welded is far. The laser beam meeting the laser-weakly-absorptive resin member 1 is damped without transmitting to the internal part thereof. The bonding strength is insufficiently obtained.

The thermoplastic rein contained in the both resin members 1, 2 is not restricted as long as publicly known resins in which the laser beam absorbent can be contained.

The thermoplastic resin is exemplified as follows. A polyphenylene sulfide resin (PPS); a polyamide resin (NYRON (registered trademark), PA); a polyolefin resin such as a polyethylene resin (PE) and a polypropylene resin (PP); a polystyrene resin (PS); a polymethylpentene resin; a methacryl resin; an acryl polyamide resin; an ethylene vinyl alcohol resin (EVOH), a polycarbonate resin; a polyester resin such as a polyethylene terephthalate resin (PET) and a polybutylene terephthalate resin (PBT); a polyacetal resin; a polyvinyl chloride resin; an aromatic vinyl resin; a polyvinylidene chloride resin; a polyphenylene oxide resin; a polyarylate resin; a polyallyl sulfone resin; a polyphenylene oxide resin; an acrylic resin such as an acryl polyamide resin and a poly methacrylate methyl resin (PMMA); a fluorocarbon resin; and a liquid crystalline polymer.

The thermoplastic resin is allowed to be a copolymer resin made from plural monomers that construct the above-mentioned thermoplastic resins. Concrete examples of the copolymer resin are an AS copolymer resin (acrylonitrile-styrene), an ABS copolymer resin (acrylonitrile-butadiene-styrene), an AES (acrylonitrile-EPDM-styrene) copolymer resin, a PA-PBT copolymer resin, a PET-PBT copolymer resin, a PC-PBT copolymer resin, a PS-PBT copolymer resin and a PC-PA copolymer resin. And other concrete examples of the copolymer resin are a thermoplastic elastomer such as a polystyrene thermoplastic elastomer, a polyolefin thermoplastic elastomer, a polyurethane thermoplastic elastomer and a polyester thermoplastic elastomer; synthetic wax or natural wax that contains the above-mentioned resins as the main component. Incidentally, molecular weight of the thermoplastic resins is not intended to be restricted. These thermoplastic resins thereof may be used individually or a mixture of two or more resins may be used.

It is preferable that the thermoplastic resin is the polyamide resin; the polycarbonate resin; the polypropylene resin; the polyester resin such as the polybutylene terephthalate resin; the polyphenylene sulfide resin. In these resins, the polyamide resin and the polycarbonate resin are further preferable on the point of view of exhibiting good compatibility with the laser beam absorbent such as the nigrosine.

The polyamide resin in the present invention refers to a polyamide polymer which has acid amide groups (—CONH—) in the molecular thereof and can be molten by heating. The preferred polyamide resin is the polyamide resin which contains following salts as a constitutional unit (a). The salts are at least one selected from the group consisting of salt made of aliphatic diamine and aromatic dicarboxylic acid and salt made of aromatic diamine and aliphatic dicarboxylic acid. A ratio of the constitutional unit (a) to whole constitutional unit of the poly amide resin is preferably 30% by mole or more, further preferably 40% by mole or more. Further specifically, various polyamide resins such as a lactam polycondensation product, a polycondensation product of diamine and dicarboxylic acid, a polycondensation product of ω-amino carboxylic acid, and a polyamide resin copolymer and blended resin which are made from these. As the lactam which is a raw material for polycondensation of the poly amide resin, for example, ε-caprolactam, enantholactam, capryllactam, lauryllactam, α-pyrrolidone, α-piperidone, ω-laurolactam and the like are included.

As the diamine, the aliphatic diamine such as tetramethylene diamine, pentamethylene diamine, hexamethylene diamine, octamethylene diamine, undecamethylene diamine, dodecamethylene diamine, 2-methyl pentamethylene diamine, (2,2,4- or 2,4,4-)trimethyl hexamethylene diamine, nonamethylene diamine and 5-methyl nonane methylene diamine; alicyclic diamine such as 1,3-bis(aminomethyl)cyclohexane, 1,4-bis(aminomethyl)cyclohexane, 1,3-diamino cyclohexane, 1,4-diamino cyclohexane, 1,3-diamino cyclohexane, 1,4-diamino cyclohexane, 1,3-diaminomethyl-3,5,5-trimethyl cyclohexane, bis(4-aminocyclohexyl)methane, bis(3-methyl-4-aminocyclohexyl)methane, 2,2-bis(4-aminocyclohexyl)propane, bis(aminomethyl)decalin, bis(aminomethyl)tricyclodecane, bis(aminopropyl)piperazine and aminoethyl piperazine; the aromatic diamine such as metaxylylene diamine (MXDA), paraxylylene diamine, paraphenylene diamine, bis(4-aminophenyl)ether and bis(aminomethyl)naphthalene are included.

As the dicarboxylic acid, the aliphatic dicarboxylic acid such as adipic acid, suberic acid, azelaic acid, sebacic acid, dodecanedioic acid, glutaric acid, pimelic acid, undecanedioic acid, dodeca dioic acid, hexadeca dioic acid, hexadecene dioic acid, eicosane dioic acid, diglycolic acid, 2,2,4-trimethyl adipic acid and the like; alicyclic dicarboxylic acid such as 1,4-cyclohexane dicarboxylic acid and the like; the aromatic dicarboxylic acid such as terephthalic acid, isophthalic acid, 2-chloroterephthalic acid, 2-methylterephthalic acid, 5-methylisophthalic acid, 5-sodium sulfoisophthalic acid, hexahydroterephthalic acid, hexahydroisophthalic acid, xylylene dicarboxylic acid and the like are included.

As the ω-amino carboxylic acid, 6-aminocaproic acid, 11-aminoundecanoic acid, 12-amino dodecanoic acid, paraamino methyl benzoic acid, 2-chloro-paraamino methyl benzoic acid, 2-methyl-paraamino methyl benzoic acid and the like are included.

As the polyamide resin, polyamide 4, polyamide 6, polyamide 6I, polyamide 11, polyamide 12, polyamide 46, polyamide 56, polyamide 66, polyamide 69, polyamide 610, polyamide 612, polyamide 6T, polyamide 96, polyamide 9T, amorphous polyamide, high melting point polyamide, polyamide RIM, polyamide MXD6, polyamide MP6, polyamide MP10 and aromatic polyamide resins containing two or more kinds thereof, a semi-aromatic polyamide resin, an aliphatic polyamide resin and copolymers of these etc. are included. As the copolymers, a polyamide 6/12 copolymer, a polyamide 6/66 copolymer, a polyamide 66/6I copolymer, a polyamide 6I/6T copolymer, a polyamide 6/66/610 copolymer, a polyamide 6/66/11/12 copolymer and a crystalline polyamide/amorphous polyamide copolymer are included. Further, the polyamide resin may be a mixed polymer of the polyamide resin and another synthetic resin. Examples of the mixed polymer are a polyamide/polyester mixed polymer, a polyamide/polyphenyleneoxide mixed polymer, a polyamide/polycarbonate mixed polymer, a polyamide/polyolefin mixed polymer, a polyamide/styrene/acrylonitrile mixed polymer, a polyamide/acrylic acid ester mixed polymer and a polyamide/silicone mixed polymer. These polyamide resins may be used solely or plurally.

The polyphenylene sulfide (PPS) resin is a polymer mainly having repeated units of thiophenylene group represented by (-ϕ-S—) [ϕ is a phenylene group having substitutional groups or no substitutional group]. The PPS resin is produced through polymerizing a monomer synthesized by reacting p-dichlorobenzene and alkali sulfide at a high temperature and high pressure. The PPS resin is broadly classified into two types. One type is a straight-chained type which is produced through only a polymerization process using an auxiliary initiator so as to have a desired polymerization degree. The other type is a crosslinked type which is produced through heat-crosslinking a polymer having low molecular weight under presence of oxygen. The PPS resin of the straight-chained type is preferable because the transmissivity thereof is superior. Melting viscosity of the PPS resin is not intended to be limited as long as kneading with melting can be performed. Generally, the melting viscosity is preferably ranged from 5 to 2000 Pa·s, more preferably from 100 to 600 Pa·s.

The PPS resin may be a polymer alloy. Examples of the polymer alloy are a PPS/polyolefin alloy, a PPS/polyamide alloy, a PPS/polyester alloy, a PPS/polycarbonate alloy, a PPS/polyphenylene ether alloy, a PPS/liquid crystal polymer alloy, a PPS/polyimide alloy and a PPS/polysulfone alloy. The PPS resin has chemical resistance, heat resistance and high strength and so it is preferably used for electronic parts and automotive parts.

Examples of the polyester resin are the polyethylene terephthalate resin that is prepared by condensation polymerization reaction of terephthalic acid and ethylene glycol, and the polybutylene terephthalate resin that is prepared by condensation polymerization reaction of terephthalic acid and butylene glycol. Examples of the other polyester resin are copolymers of which a part of a terephthalic acid component and/or a part of a glycol component is substituted with a substituent group such as an alkyl group having 1 to 4 carbon atoms. In the terephthalic acid component, the substituent group is 15% by mole or less (e.g. 0.5 to 15% by mole), preferably 5% by mole or less (e.g. 0.5 to 5% by mole). And/or in the glycol component such as the ethylene glycol and the butylene glycol, the substituent group is 15% by mole or less (e.g. 0.5 to 15% by mole), preferably 5% by mole or less (e.g. 0.5 to 5% by mole). The polyester resin may be used as individual or two or more kinds thereof.

As the dicarboxylic acid compound composing the polyester resin, specifically the derivatives for forming aromatic dicarboxylic acid or ester are preferably used. Examples of the aromatic dicarboxylic acid are terephthalic acid, isophthalic acid, orthophthalic acid, 1,5-naphthalene dicarboxylic acid, 2,5-naphthalene dicarboxylic acid, 2,6-naphthalene dicarboxylic acid, biphenyl-2,2'-dicarboxylic acid, biphenyl-3,3'-dicarboxylic acid, biphenyl-4,4'-dicarboxylic acid, diphenyl ether-4,4'-dicarboxylic acid, diphenyl methane-4,4'-dicarboxylic acid, diphenyl sulfone-4,4'-dicarboxylic acid, diphenyl isopropyliden-4,4'-dicarboxylic acid, 1,2-bis(phenoxy)ethane-4,4'-dicarboxylic acid, anthracene-2,5-dicarboxylic acid, anthracene-2,6-dicarboxylic acid, p-terphenylene-4.4'-dicarboxylic acid, pyridine-2,5-dicarboxylic acid and so on. The terephthalic acid is preferable. These dicarboxylic acids may be used by mixing two or more kinds thereof. As publicly known, dimethyl ester etc. other than free acid may be used for the polycondensation reaction as the derivatives for forming the ester. Incidentally, one or more kinds of the aliphatic dicarboxylic acid and/or the alicyclic dicarboxylic acid are mixed and may be used together with the aromatic dicarboxylic acid as long as amounts thereof is a little. Examples of the aliphatic dicarboxylic acid are adipic acid, azelaic acid, dodecanedioic acid, sebacic acid and the like. Examples of the alicyclic dicarboxylic acid are 1,2-cyclohexane dicarboxylic acid, 1,3-cyclohexane dicarboxylic acid, 1,4-cyclohexane dicarboxylic acid and the like.

As a dihydroxy compound composing the polyester resin, aliphatic diol, alicyclic diol, a mixture thereof and the like are exemplified. Examples of the aliphatic diol are ethylene glycol, propylene glycol, butane diol, hexylene glycol, neopentyl glycol, 2-methylpropane-1,3-diol, diethylene glycol, triethylene glycol and the like. Examples of the alicyclic diol are cyclohexane-1,4-dimethanol and the like. Incidentally, one or more kinds of long-chained diol having molecular weight of 400 to 6000 may be copolymerized as long as an amount thereof is a little. Examples of the long-chained diol are polyethylene glycol, poly-1,3-propylene glycol, polytetramethylene glycol and the like. Further, aromatic diol such as hydroquinone, resorcin, naphthalene diol, dihydroxydiphenyl ether, 2,2-bis(4-hydroxy phenyl)propane and the like may be used. In order to introduce a branched structure, a trifunctional monomer other than the above bifunctional monomer may be slightly used together therewith. Examples of the trifunctional monomer are trimellitic acid, trimesic acid, pyromellitic acid, pentaerythritol, trimethylolpropane and the like. In order to adjust molecular weight, a monofunctional compound such as aliphatic acid etc. may be slightly used together therewith.

The polyester resin mainly containing a polycondensation product of the dicarboxylic acid and the diol is used. That is, 50% by mass or more, preferably 70% by mass or more of the polycondensation product is contained in the whole polyester resin. The preferred dicarboxylic acid is the aromatic dicarboxylic acid. The preferred diol is the aliphatic diol. An acid component more preferably contains the terephthalic acid in content of 95% by mass or more. An alcoholic component more preferably contains polyalkylene terephthalate which is the aliphatic diol in content of 95% by mass or more. Examples thereof are polybutylene terephthalate and polyethylene terephthalate. The polyester resin which is almost homo-polyester is preferable. That is, in the whole resin, 95% by mass thereof is the terephthalic acid component and 1,4-butanediol or the ethylene glycol component. The polyester resin mainly based on the polybutylene terephthalate is preferable. The polybutylene terephthalate may be a copolymer of polyalkylene glycol such as the isophthalic acid, dimer acid, the polytetramethylene glycol (PTMG) and the like.

Examples of the polyolefin resin are a homopolymer of α-olefin and a copolymer thereof, and a copolymer of these polymers and another unsaturated monomer capable of copolymerization (the copolymer may be a block copolymer, a random copolymer and a graft copolymer.) Examples of the α-olefin are ethylene, propylene, butene-1, 3-methylbutene-1, 4-methylpentene-1 and octene-1. Specifically, a polyethylene resin, a polypropylene resin, polybutene-1 and poly4-methlpentene-1 are exemplified. Examples of the polyethylene resin are high density polyethylene, medium density polyethylene, low density polyethylene, linear low density polyethylene, an ethylene-vinyl acetate copolymer and an ethylene-ethyl acrylate copolymer. Examples of the polypropylene resin are a polypropylene homopolymer, a propylene-ethylene block copolymer or random copolymer, a propylene-ethylene-butene-1 copolymer. These polyolefin resins may be used as individual or a mixture of plural kinds thereof. Among these, the polyethylene resin and/or the polypropylene resin are preferable. The polypropylene resin is more preferable. Molecular weight of the polypropylene resin is not intended to be restricted. The polypropylene type resin having the widely ranged the molecular weight may be used.

Incidentally, as the polyolefin resin, acid-modified polyolefin that is modified by unsaturated carboxylic acid or the derivatives thereof and a foam resin which contains a foaming agent and is like foam polypropylene may be used. And the polyolefin resin may include ethylene-α-olefin copolymer rubber; an ethylene-α-olefin-nonconjugated diene compound copolymer such as ethylene propylene diene-type monomer (EPDM); ethylene-aromatic monovinyl compound-conjugated diene compound copolymer rubber; and/or hydrogenated rubber of the above.

The polycarbonate resin is the thermoplastic resin having carbonic ester bindings in principle chain thereof. The polycarbonate resin has an excellent mechanical property, heat resistance, cold resistance, electrical property and transparency, and is an engineering plastic. As the polycarbonate resin, any of an aromatic polycarbonate resin and an aliphatic polycarbonate resin may be used. The aromatic polycarbonate resin is preferable. The aromatic polycarbonate resin is a thermoplastic polymer obtained through a reaction as follows. An aromatic dihydroxy compound or this compound and a little amount of a polyhydroxy compound is reacted with phosgene or diester carbonate. The aromatic polycarbonate resin may have branched chains and may be a copolymer. A method for producing the aromatic polycarbonate resin is not intended to be restricted. The aromatic polycarbonate resin may be produced by a conventionally known method such as a phosgene process (an interfacial process) and a melt process (a transesterification process). In addition, when the aromatic polycarbonate resin produced by the melt process is used, an amount of OH groups as terminal groups may be optimized.

Examples of the aromatic dihydroxy compound which is source material of the aromatic polycarbonate resin are 2,2-bis(4-hydroxyphenyl)propane (i.e. bisphenol A), tetra methyl bisphenol A, bis(4-hydroxyphenyl)-p-diisopropyl benzene, hydroquinone, resorcinol, 4,4-dihydroxydiphenyl and the like. The preferred compound is the bisphenol A. A compound in which one or more tetraalkylphosphonium sulfonate are bonded to the above aromatic dihydroxy compound may be used. The branched aromatic polycarbonate resin may be obtained by substituting a part of the above mentioned aromatic dihydroxy compound with a compound of a branching agent. Examples of the compound thereof are a polyhydroxy compound such as phloroglucin, 4,6-dimethyl-2,4,6-tri(4-hydroxyphenyl)heptene-2, 4,6-dimethyl-2,4,6-tri(4-hydroxyphenyl)heptane, 2,6-dimethyl-2,4,6-tri(4-hydroxyphenyl)heptene-3, 1,3,5-tri(4-hydroxyphenyl)benzene, 1,1,1-tri(4-hydroxyphenyl)ethane and the like and/or a compound such as 3,3-bis(4-hydroxyaryl)oxyindole (i.e. isatin bisphenol), 5-chloroisatin, 5,7-dichloroisatin, 5-bromoisatin and the like. An amount of these compounds for substitution is generally 0.01 to 10% by mole, preferably 0.1 to 2% by mole with respect to the aromatic dihydroxy compound.

The preferred aromatic polycarbonate resin is a polycarbonate resin derivatized from 2,2-bis(4-hydroxyphenyl)propane or a polycarbonate copolymer derivatized from 2,2-bis(4-hydroxyphenyl)propane and other aromatic dihydroxy compounds. In addition, the aromatic polycarbonate resin mainly has the polycarbonate resin, and may be a copolymer produced by the polycarbonate resin and a polymer or oligomer having a siloxane structure. Further a mixture of two or more kinds of the above mentioned aromatic polycarbonate resin may be used.

When the nigrosine or the carbon black as a black coloring agent is employed as the laser beam absorbent, the laser-weakly-absorptive resin member 1 and the laser-absorptive resin member 2 have the color tone from a gray color to a black color in accordance with the contents thereof. Especially, in order to obtain the comparatively high absorbance $a_2$ ranged from 3.0 to 15, the laser-absorptive resin member 2 contains more the laser beam absorbent than the laser-weakly-absorptive resin member 1. Thereby the laser-absorptive resin member 2 has often the black color. On the other hand, in the laser-weakly-absorptive resin member 1, the content of the laser beam absorbent is decided so as to obtain the absorbance $a_1$ ranged from 0.09 to 0.9. Thereby color density of the laser-weakly-absorptive resin member 1 is insufficient and may have a light color e.g. the gray color. In this case, the coloring agent may be added into the laser-weakly-absorptive resin composition therefor in order to impart the desired color density to the laser-weakly-absorptive resin member 1. Thereby when the both resin member 1, 2 have the same color, a boundary therebetween and a welding mark may be diminished.

The coloring of the thermoplastic resin is performed for the purpose of a decorative effect, a color classification effect, improvement of light resistance of the molded product, protection or masking of the contents. A black-coloring is strongly demanded in the industry.

The coloring agent is appropriately selected corresponding to the color tone and the color density of the thermoplastic resin contained in the resin composition used for preparing the both resin members 1, 2 and further considering applications and conditions of use. For example, when the black color which is the deep color will be imparted to the both resin members 1, 2, the black coloring agent is prepared by combining the various kinds of the coloring agent. Examples of a combination of the coloring agents are a combination of a blue coloring agent, a red coloring agent and a yellow coloring agent; a combination of a violet coloring agent and the yellow coloring agent; and a combination of a green coloring agent and a red coloring agent. The coloring by the oil soluble dye is suitable because an oil soluble dye exhibits a good dispersibility and compatibility with respect to the resin. Especially, the nigrosine may be used for as the black coloring agent and as the laser beam absorbent and may impart the higher bonding strength, and so it may be preferably used.

A structure of the coloring agent and the color tone thereof is not intended to be restricted. The coloring agent containing various organic dyes and pigments is exemplified. Examples of the dyes and the pigments are azo series, azomethine series, anthraquinone series, quinacridone series, dioxazine series, diketopyrrolopyrrole series, anthrapyridone series, isoindolinone series, indanthrone series, perinone series, perylene series, indigo series, thioindigo series, quinophthalone series, quinoline series and triphenylmethane series.

The preferred coloring agent is a product combining various dyes having a visible light absorptivity, a rich compatibility with the thermoplastic resin and low scattering properties with respect to the laser beam. The more preferred coloring agent is a product which is difficult to bleach by a high temperature generated at the time of molding the both resin members 1, 2 and by a high temperature generated at the time of melting due to irradiating with the laser beam; has excellent heat resistance; having non-absorptivity with respect to a wavelength of a near-infrared range of the laser beam; and has transmittivity with respect to the wavelength thereof. As the coloring agent having the transmittivity with respect to the wavelength of the laser beam, a coloring agent containing an anthraquinone dye is exemplified.

The anthraquinone dye is preferably an anthraquinone oil soluble dye. For example, the dyes represented by Color Index are commercially available, specifically as follows: C.I. Solvent Blue 11, 12, 13, 14, 26, 35, 36, 44, 45, 48, 49, 58, 59, 63, 68, 69, 70, 78, 79, 83, 87, 90, 94, 97, 98, 101, 102, 104, 105, 122, 129 and 132; C.I. Disperse Blue 14, 35, 102 and 197; C.I. Solvent Green 3, 19, 20, 23, 24, 25, 26, 28, 33 and 65; and C.I. Solvent Violet 13, 14, 15, 26, 30, 31, 33, 34, 36, 37, 38, 40, 41, 42, 45, 47, 48, 51, 59 and 60.

The anthraquinone dye having a maximum absorption wavelength ranged from 590 to 635 nm is exemplified. The anthraquinone dye exhibits often a blue color and has a high visibility as compared with an anthraquinone green dye. When mixed black coloring agents are prepared by combining, a red dye and/or a yellow dye is combined with an anthraquinone blue dye by subtractive color mixing to obtain the coloring agent of a deep black color having a high colorability.

The anthraquinone dye preferably has transmittance of 60 to 95% with respect to the 940 nm laser beam. As the anthraquinone dye which is commercially available, for example, "NUBIAN (registered trademark) BLUE series" and "OPLAS (registered trademark) BLUE series" (all are tradenames, available from ORIENT CHEMICAL INDUSTRIES CO., LTD.) are exemplified.

Preferred electrical conductivity of the anthraquinone dye is 50 to 500 µS/cm. Thereby, since the insulation of the respective resin members 1, 2 is increased, the laser welded body 10 is suitable for resin parts such as parts for electrical and electronic apparatus and parts for precision apparatus which require the high insulation.

The electrical conductivity is measured as follows. The anthraquinone dye in an amount of 5 g is dispersed to 500 mL of ion-exchange water, followed by recording weight thereof. An ion component is extracted by boiling the ion-exchange water to which the anthraquinone dye has been dispersed for 10 minutes, followed by filtrating. Ion-exchange water is added to the resultant filtrate until weight thereof is same as the preliminarily measured weight. The electrical conductivity of this solution is measured by using an electrical conductivity meter (manufactured by DKK-TOA CORPORATION, tradename: AOL-10).

Examples of a combination of the dyes are a combination of the anthraquinone blue dye and another blue dye, the red dye and the yellow dye; and a combination of the anthraquinone blue dye and a green dye, the red dye and the yellow dye. Examples of the red dye and the yellow dye are an azo dye, a quinacridone dye, a dioxazine dye, a quinophthalone dye, a perylene dye, a perinone dye, an isoindolinone dye, an azomethine dye, a triphenylmethane dye and a red or yellow anthraquinone dye. These dyes may be used as individual or two or more dyes in combination. As the dye which imparts good coloring to a laser-absorptive resin composition, a perinone red dye, an anthraquinone red dye and an anthraquinone yellow dye are exemplified.

A combination of the above anthraquinone blue dye having the maximum absorption wavelength ranged from 590 to 635 nm and the red dye are preferably used. As a suitable example, the perinone dye is exemplified. The perinone dye has the good heat resistance and exhibits often a red color. As the red dye which is commercially available, for example, "NUBIAN (registered trademark) RED series"

and "OPLAS (registered trademark) RED series" (all are tradenames, available from ORIENT CHEMICAL INDUSTRIES CO., LTD.) are exemplified.

Examples of the perinone dye are specifically C.I. Solvent Orange 60; C.I. Solvent Red 135, 162, 178 and 179.

Examples of an anthraquinone red dye (including the anthrapyridone dye) are C.I. Solvent Red 52, 111, 149, 150, 151, 168, 191, 207, and 227; C.I. Disperse Red 60. The perinone dye and the anthraquinone red dye are represented by Color Index and commercially available.

A preferred dye adapted to be combined with the anthraquinone red dye is an anthraquinone yellow dye. In the coloring agent, a range of a mass ratio (i)/(ii) of (i) a mass of the anthraquinone yellow dye/(ii) a mass of the blue, green and/or violet anthraquinone dye is preferably 0.15 to 1.0. As a commercially available product of the anthraquinone yellow dye, for example, "NUBIAN (registered trademark) YELLOW series" and "OPLAS (registered trademark) YELLOW series" (all are tradenames, available from ORIENT CHEMICAL INDUSTRIES CO., LTD.) are exemplified.

Examples of the yellow dye include dyes represented by following Color Index: C.I. Solvent Yellow 14, 16, 32, 33, 43, 44, 93, 94, 98, 104, 114, 116, 133, 145, 157, 163, 164, 167, 181, 182, 183, 184, 185, and 187; C.I. Vat Yellow 1, 2 and 3. These are commercially available.

When robustness such as weather fastness, heat resistance and resistance to bleed are needed to the laser welded body 10, a salt-forming dye combining an acid dye and organic amine is preferably used as the above oil soluble dye. The salt-forming dye may be represented by [anion of the acid dye·organic ammonium salt]. In the coloring agent, the anthraquinone dye is substituted with the salt-forming dye, and an anthraquinone salt-forming dye represented by such as [anion of the acid dye·organic ammonium salt] are employed. Thereby, the robustness of the coloring agent is increased.

Examples of an anthraquinone acid dye used for the salt-forming dye include the anthraquinone dye which has a single sulfonic acid group in a single molecule and is represented by following Color Index: especially C.I. Acid Blue 25, 27, 40, 41, 43, 45, 47, 51, 53, 55, 56, 62, 78, 111, 124, 129, 215, 230 and 277; C.I. Acid Green 37; and C.I. Acid Violet 36, 41, 43, 51 and 63. These are commercially available.

Examples of the anthraquinone acid dye other than those above include the anthraquinone dye which has two sulfonic acid groups in a single molecule of anthraquinone, and is represented by following Color Index: especially C.I. Acid Blue 23, 35, 49, 68, 69, 80, 96, 129:1, 138, 145, 175, 221 and 344; C.I. Acid Green 25, 27, 36, 38, 41, 42 and 44; and C.I. Acid Violet 34 and 42. These are commercially available.

The preferred anthraquinone dye has a structure of which a sub stituent group having a sulfonic acid group is bonded to an anilino group. This structure is included in an anthraquinone molecular scaffold as at least one of a sub stituent group. Among others, C.I. Acid Blue 49, 80, 96, 129:1, 138, 145 and 221; the above C.I. Acid Green 25, 27, 36, 38, 41, 42 and 44; and C.I. Acid Violet 34 are exemplified.

An example of the preferred salt-forming dye of the anthraquinone is an anthraquinone salt-forming dye having anilino group derivatives as the substituent group. The anthraquinone salt-forming dye is represented by A⁻B⁺ (A⁻ is an anion from the anthraquinone and B⁺ is a cation from an organic ammonium) or AB (A is a dehydrogenated residue of the anthraquinone molecular scaffold or a dehydrogenated residue of a substitute group bonding to the anthraquinone and B is a dehydrogenated residue of an organic ammonium). The anthraquinone salt-forming dye exhibits the high compatibility relative to an aromatic thermoplastic resin and imparts the high heat resistance relative thereto.

The preferred anthraquinone salt-forming dye is represented by the following formula (1):

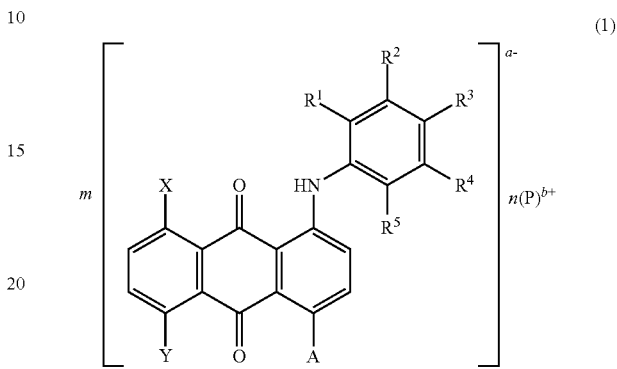

(wherein X and Y are independently a hydrogen atom, a hydroxy group, a halogen atom or an amino group; $R^1$ to $R^5$ are independently a hydrogen atom, a hydroxy group, an amino group, a nitro group, a straight or branched alkyl group having 1 to 18 carbon atoms, a straight or branched alkoxy group having 1 to 18 carbon atoms, a halogen atom, a phenyloxy group or a carboxy group; $(P)^{b+}$ is an organic ammonium ion; a and b are 1 to 2 positive numbers; m and n are 1 to 2 positive numbers; A is a hydrogen atom, a hydroxy group, an amino group, a halogen atom or a group represented by following the formula (2):

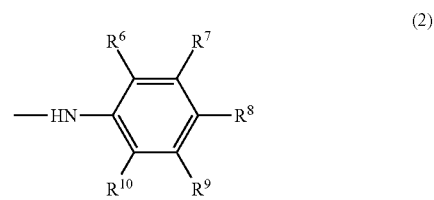

(in the formula (2), $R^6$ to $R^{10}$ are independently a hydrogen atom, a hydroxy group, an amino group, a nitro group, a straight or branched alkyl group having 1 to 18 carbon atoms, a straight or branched alkoxy group having 1 to 18 carbon atoms, or a halogen atom.)).

In the formulas (1) and (2), examples of the straight or branched alkyl group having 1 to 18 carbon atoms are specifically a methyl group, an ethyl group, a n-propyl group, an isopropyl group, a n-butyl group, a sec-butyl group, an isobutyl group, a tert-butyl group, a n-pentyl group, a neopentyl group, an isopentyl group, a sec-pentyl group, a 3-pentyl group, a tert-pentyl group, a hexyl group, a heptyl group and an octyl group. Examples of the straight or branched alkoxy group having 1 to 18 carbon atoms are specifically a methoxy group, an ethoxy group, a n-propoxy group, an isopropoxy group, a n-butoxy group, a sec-butoxy group, an isobutoxy group, a tert-butoxy group, a n-pentyloxy group, a neopentyloxy group, an isopentyloxy group, a sec-pentyloxy group, a 3-pentyloxy group, a tert-pentyloxy group and a hexyloxy group. Examples of the halogen atom are specifically fluorine, chlorine, bromine and iodine.

The preferred salt-forming dye represented by the formula (1) is the anthraquinone salt-forming dye having two phenylamino derivatives in a single molecule as a substituent. Thereby, heat degradation of the both resin members 1, 2 due to melting by heat is prevented at the time of molding and laser-welding these. The anthraquinone acid dye is suitable for the salt-forming dye. Examples of the anthraquinone acid dye having the two phenylamino derivatives in the single molecule as the substituent are specifically C.I. Acid Green 25, 27, 36, 38, 41, 42 and 44; C.I. Acid Blue 80 and 221; and C.I. Acid Violet 34.

Examples of preferred amines used for the salt-forming dye represented by the formula (1) are aliphatic monoamine such as hexylamine, pentylamine, octylamine, 2-ethyl hexylamine, di-(2-ethylhexyl)amine and dodecylamine; alicyclic amine such as cyclohexylamine, dicyclohexylamine and dihydroaziethylamine; aliphatic, alicyclic or aromatic diamine such as tetramethylenediamine, hexamethylenediamine, octamethylenediamine, nonamethylenediamine, dodecamethylenediamine, 2-methylpentamethylenediamine, 2-methyloctamethylenediamine, trimethylhexamethylenediamine, bis(p-aminocyclohexyl)methane, m-xylenediamine and p-xylenediamine; alkoxy alkyl amine such as 3-propoxypropylamine, di-(3-ethoxypropyl)amine, 3-butoxypropylamine, octooxypropylamine and 3-(2-ethylhexyloxy)propylamine; aromatic amine such as α-naphthylamine, β-naphthylamine, 1,2-naphthylenediamine, 1,5-naphthylenediamine and 1,8-naphthylenediamine; aromatic alkyl amine such as 1-naphthylmethylamine; amine containing an alkanol group such as N-cyclohexylethanolamine, N-dodecylethanolamine and N-dodecylimino-diethanol; guanidine derivatives such as 1,3-diphenylguanidine, 1-o-tolylguanidine and di-o-tolylguanidine.

As the amines, commercially available quaternary ammonium may be employed. Examples of the quaternary ammonium are specifically QUARTAMIN 24P, QUARTAMIN 86P conc., QUARTAMIN 60W, QUARTAMIN 86W, QUARTAMIN D86P (distearyldimethylammonium chloride), SANISOL C and SANISOL B-50, (as above, available from Kao Corporation, QUARTAMIN and SANISOL are registered trademark.); ARQUAD 210-80E, 2C-75, 2HT-75 (dialkyl (alkyl is $C_{14}$ to $C_{18}$) dimethylammonium chloride), 2HT flake, 20-75I, 2HP-75 and 2HP flake (as above, available from LION SPECIALTY CHEMICALS CO., LTD., ARQUAD is tradename); PRIMENE MD amine (methanediamine), PRIMENE 81-R (a mixture of hyper-branched tert-alkyl ($C_{12}$ to $C_{14}$) primary amine isomers), PRIMENE TOA amine (tert-octylamine), PRIMENE RB-3 (a mixture of tert-alkyl primary amine) and PRIMENE JM-T amine (a mixture of hyper-branched chain tert-alkyl ($C_{16}$ to $C_{22}$) primary amine isomer) (as above, available from Dow Chemical Company, PRIMENE is registered trademark).

A content of the coloring agent is 0.01 to 5 parts by mass, preferably 0.05 to 3 parts by mass and more preferably 0.1 to 2 parts by mass with respect to 100 parts by mass of the thermoplastic resin. When the content of the coloring agent is adjusted to be the above range, the resin composition used for molding the both resin members 1, 2 having high coloring is obtained.

When preparing the resin composition, it is preferable that a masterbatch containing the coloring agent is prepared, and then the masterbatch is added into the thermoplastic resin composition. Thereby, the resin composition has no irregular color because the coloring agent is homogeneously dispersed. A content of the coloring agent in the masterbatch is preferably 5 to 90% by mass and more preferably 20 to 60% by mass.

As needed, various additives may be blended into a raw material of the thermoplastic resin beside the coloring agent. Examples of the additive are a reinforcer, a filler, an ultraviolet-absorptive agent or a light-stabilizer, an antioxidant, an antibacterial agent, a fungicide, a flame retardant, a mold release agent, a crystal nucleating agent, a plasticizer, an impact modifier, an auxiliary coloring agent, a dispersant, a stabilizer, a reforming agent, an antistatic agent, a lubricant and a crystallization accelerator. Further, a white pigment and an organic white pigment such as titanium oxide, zinc sulfate, zinc white (zinc oxide), calcium carbonate and alumina white are exemplified. Thereby, the achromatic raw material of the thermoplastic resin is adjusted to have a chromatic color by combining with the organic dye and pigment.

The reinforcer is freely selected as long as a product can be used for reinforcing a synthetic resin. Examples of the reinforcer are an inorganic fiber such as a glass fiber, a carbon fiber, a metal fiber, a calcium titanate fiber, a calcium silicate fiber, sepiolite, wollastonite and rock wool; and an organic fiber such as aramid, a polyphenylene sulfide resin, polyamide, polyester and liquid crystalline polymer. For example, when a transparency will be imparted to the resin member, the glass fiber is suitable for reinforcing it. A fiber length of the glass fiber is 2 to 15 mm, and a fiber diameter thereof is 1 to 20 μm. A type of the glass fiber is freely selected, and a roving fiber and a milled fiber are exemplified. The glass fiber may be used individually or two or more kinds of the glass fiber may be used in combination. A content thereof is preferably 5 to 120 parts by mass with respect to 100 parts by mass of the both resin members 1, 2. If it is less than 5 parts by mass, a reinforcing effect by the glass fiber is insufficiently exhibited. If it is higher than 120 parts by mass, moldability is decreased. The content thereof is preferably 10 to 60 parts by mass, more preferably 20 to 50 parts by mass.

As the filler, a particulate filler is exemplified. Examples of the particulate filler are silicate such as talc, kaolin, clay, wollastonite, bentonite, asbestos and alumina silicate; metal oxide such as alumina, silicon oxide, magnesium oxide, zirconium oxide and titanium oxide; carbonate such as calcium carbonate, magnesium carbonate and dolomite; sulfate such as calcium sulfate and barium sulfate; ceramics such as glass beads, ceramic beads, boron nitride and silicon carbide. In addition, the filler may be a plate-like filler such as mica, sericite and glass flake.

Examples of the ultraviolet-absorptive agent and the light-stabilizer include a benzotriazole-based compound, a benzophenone-based compound, a salicylate-based compound, a cyanoacrylate-based compound, a benzoate-based compound, an oxanilide-based compound, a hindered amine-based compound and a nickel complex salt.

Examples of the antioxidant include a phenolic antioxidant, a phosphoric antioxidant, and a sulfuric antioxidant and a thioetheric antioxidant.

The phenolic antioxidant has a phenolic hydroxyl group. Among others, a hindered phenolic antioxidant is preferably used. In the hindered phenolic antioxidant, one or two carbon atoms neighboring the carbon atoms of the aromatic ring to which the phenolic hydroxyl group bonds is substituted with a substituent group having 4 or more carbon atoms. The substituent group having the 4 or more carbon atoms may bond to the carbon atom of the aromatic ring via a carbon-carbon bond, and may bond thereto via an atom except for a carbon atom.

The phosphoric antioxidant has a phosphorus atom. The phosphoric antioxidant may be an inorganic phosphate compound such as sodium phosphite, sodium hypo phosphite and the like; or an organic antioxidant having a P(OR)$_3$ structure. Hereat, R is an alkyl group, an alkylene group, an aryl group, an arylene group and the like. Three of R may be the same or different, and any two of R may form a ring structure by bonding together. Examples of the phosphoric antioxidant include triphenyl phosphite, diphenyldecyl phosphite, phenyldiisodecyl phosphite, tri(nonylphenyl) phosphite, bis(2,4-di-tert-butylphenyl)pentaerythritol diphosphite, bis(2,6-di-tert-butyl-4-methylphenyl)pentaerythritol diphosphite and the like.

The sulfuric antioxidant has a sulfur atom. Examples of the sulfuric antioxidant include didodecyl thiodipropionate, ditetradecyl thiodipropionate, dioctadecyl thiodipropionate, pentaerythritol tetrakis(3-dodecylthiopropionate), thiobis (N-phenyl-(β-naphthylamine), 2-mercaptobenzothiazole, 2-mercaptobenzoimidazole, tetramethylthiuram monosulfide, tetramethylthiuram disulfide, nickel dibutyldithiocarbamate, nickel isopropylxanthate, trilauryl trithiophosphite and the like. Especially, the thioetheric antioxidant having a thioether structure is reduced by receiving oxygen from a substance which has been oxidized, and so preferably used.

Examples of the antibacterial agent and the fungicide include 2-(4'-thiazolyl)benzimidazole, 10,10'-oxibisphenoxyarsine, N-(fluorodichloromethylthio)phthalimide and bis (2-pyridylthio-1-oxide) zinc.

The flame retardant is freely selected. Examples thereof include an organic flame retardant and an inorganic flame retardant such as an organic halogen compound, an antimony compound, a compound having silicon, a phosphorus compound, a nitrogen compound and the like.

Examples of the organic halogen compound include brominated polycarbonate, a brominated epoxy resin, a brominated phenoxy resin, a brominated polyphenylene ether resin, a brominated polystyrene resin, brominated bisphenol A, pentabromobenzyl polyacrylate, tetrabromobisphenol A derivatives, hexabromodiphenyl ether, tetrabromophthalic anhydride and the like. Examples of the antimony compound include antimony trioxide, antimony pentaoxide, sodium antimonate, antimony phosphate and the like. Further examples of the compound having silicon include silicone oil, organosilane and aluminum silicate. Examples of the phosphorus compound include triphenyl phosphate, triphenyl phosphite, phosphoric ester, polyphosphoric acid, ammonium polyphosphate, red phosphorus and a phosphazene compound, which has a main chain including a bond of a phosphorus atom and a nitrogen atom, such as phenoxyphosphazene and amino phosphazene and the like. Examples of the nitrogen compound include melamine, cyanuric acid, melamine cyanurate, urea, guanidine and the like. Examples of the inorganic flame retardant include the aluminum hydroxide, magnesium hydroxide, a silicon compound, a boron compound and the like.

The mold release agent is freely selected. Examples thereof include a metal soap such as montanic acid waxes or lithium stearate, aluminum stearate and the like; higher fatty acid amide such as ethylene bis-stearyl amide and the like; and an ethylenediamine-stearic acid-sebacic acid polycondensate and the like.

The crystal nucleating agent is freely selected. An organic nucleating agent such as rosin and the like and an inorganic nucleating agent are often used. Examples of the inorganic nucleating agent include metal oxide such as silica, alumina, zirconia, titanium oxide, iron oxide, zinc oxide and the like; metal carbonate such as calcium carbonate, magnesium carbonate, barium carbonate and the like; silicate such as calcium silicate, aluminum silicate, talc and the like; metal carbide such as silicon carbide and the like; metal nitride such as silicon nitride, boron nitride, tantalum nitride and the like. The crystal nucleating agent is used individually or two or more kinds thereof are used by combining these.

The plasticizer is freely selected. Examples of the plasticizer include phthalate ester (e.g. dimethyl phthalate, butyl benzyl phthalate, diisodecyl phthalate and the like), phosphoric ester (e.g. tricresyl phosphate and 2-ethylhexyl diphenyl phosphate), sulfonamide plasticizers (e.g. n-butylbenzene sulfonamide, p-toluene sulfonamide and the like). Furthermore, polyester plasticizers, polyhydric alcohol ester plasticizers, polycarboxylic ester plasticizers, bisphenol plasticizers, amide plasticizers, ester plasticizers, amide ester plasticizers, glycerin plasticizers, epoxy plasticizers (e.g. epoxy triglyceride consisting of epoxy-stearic alkyl and soybean oil) and the like are exemplified.

Examples of the polyester plasticizers include polyester by dicarboxylic acid and dialcohol or a (poly) oxyalkylene adduct thereof. The dicarboxylic acid has 2 to 12 carbon atoms, preferably has 2 to 6 carbon atoms. The dialcohol has 2 to 12 carbon atoms, preferably has 2 to 6 carbon atoms. Examples of the dicarboxylic acid are succinic acid, adipic acid, sebacic acid, phthalic acid, terephthalic acid, isophthalic acid and the like. Examples of the dialcohol are propylene glycol, 1,3-butanediol, 1,4-butanediol, 1,6-hexanediol, ethylene glycol, diethylene glycol, triethylene glycol and the like. Further, a hydroxy group and a carboxy group at a terminal of the polyester may be end-capped through esterification using monocarboxylic acid and/or monoalcohol.

Examples of the polyhydric alcohol ester plasticizers include mono-, di- or triester etc. of polyhydric alcohol or the (poly) oxyalkylene adduct thereof and monocarboxylic acid. The monocarboxylic acid preferably has 1 to 12 carbon atoms, more preferably has 1 to 6 carbon atoms and furthermore preferably has 1 to 4 carbon atoms. Examples of the polyhydric alcohol are polyethylene glycol, polypropylene glycol, glycerin, the above dialcohol and the like. Examples of the monocarboxylic acid are acetic acid, propionic acid and the like.

Examples of the polycarboxylic ester plasticizers include mono-, di- or triester etc. of polycarboxylic acid and monoalcohol or a (poly) oxyalkylene adduct thereof. The monoalcohol preferably has 1 to 12 carbon atoms, more preferably has 1 to 6 carbon atoms and furthermore preferably has 1 to 4 carbon atoms. Examples of the polycarboxylic acid are trimellitic acid, the above dicarboxylic acid and the like. Examples of the monoalcohol are methanol, ethanol, 1-propanol, 1-butanol, 2-ethylhexanol and the like.

Examples of the bisphenol plasticizers are mono- or dieter etc. of bisphenol and monoalkyl halide or a (poly) oxyalkylene adduct thereof. The monoalkyl halide preferably has 1 to 18 carbon atoms, more preferably has 2 to 14 carbon atoms and furthermore preferably has 4 to 10 carbon atoms. Examples of the bisphenol are bisphenol A, bisphenol S and the like. Examples of the monoalkyl halide are 1-octylbromide, 1-dodecylbromide and 2-ethylhexylbromide.

Examples of the amide plasticizers include a carboxylic acid amide plasticizer and a sulfonamide plasticizer. Examples of the carboxylic acid amide plasticizer are amide of one or more acids and dialkylamine including alkyl groups having 2 to 8 carbon atoms. The acid is selected from the group consisting of benzoic acid, phthalic acid, trimellitic acid, pyromellitic acid and unhydride thereof. Examples of the dialkylamine including the alkyl groups having 2 to 8 carbon atoms are diethyl amine, dipropyl amine, dibutyl amine, dihexyl amine, di2-ethylhexyl amine, dioctyl amine and the like. Molecular weight of the carboxylic acid amide plasticizer is preferably 250 to 2000, more preferably 300 to 1500 and furthermore preferably 350 to 1000.

Examples of the ester plasticizers include monoester plasticizers, diester plasticizers, triester plasticizers and polyester plasticizers. Examples of the monoester plasticizers include benzoic acid ester plasticizers and stearic acid ester plasticizers. The benzoic acid ester plasticizers include benzoic acid ester consisting of benzoic acid and aliphatic alcohol having 6 to 20 carbon atoms or an alkylene oxide adduct of alkylene oxide having 2 to 4 carbon atoms and the aliphatic alcohol (an addition mole number of the alkylene oxide is 10 mole or less). Examples of the benzoic acid ester plasticizers are 2-ethylhexyl p-oxybenzoate and 2-hexyldecyl p-oxybenzoate. The stearic acid ester plasticizers include stearic acid ester consisting of stearic acid and aliphatic alcohol having 1 to 18 carbon atoms or an alkylene oxide adduct of alkylene oxide having 2 to 4 carbon atoms and the aliphatic alcohol (an addition mole number of the alkylene oxide is 10 mole or less). Examples of the stearic acid ester are methyl stearate, ethyl stearate, butyl stearate and hexyl stearate.

The impact modifier is freely selected as long as an impact modifying effect of the resin is exhibited. Publicly known products such as a polyamide elastomer, a polyester elastomer, a styrene elastomer, a polyolefin elastomer, an acryl elastomer, a polyurethane elastomer, a fluorine elastomer, a silicone elastomer and an acryl core/shell elastomer etc. are exemplified. Especially, the polyester elastomer and the styrene elastomer are preferable.

The polyester elastomer is thermoplastic polyester having rubber properties at a room temperature. The preferred polyester elastomer is the thermoplastic polyester mainly including a polyester block copolymer. The preferred polyester block copolymer has aromatic polyester having high melting point and high crystallinity as a hard segment, and amorphous polyester and/or amorphous polyether as a soft segment. A soft segment content of the polyester elastomer is at least 20 to 95% by mole in the all segments. For example, the soft segment content of a block copolymer (PBT-PTMG copolymer) of polybutylene terephthalate and polytetramethylene glycol is 50 to 95% by mole. The preferred soft segment content is 50 to 90% by mole, specifically 60 to 85% by mole. A polyesterether block copolymer, especially the PBT-PTMG copolymer, is preferable because decrease of transmittance thereof is prevented.

The styrene elastomer consists of a styrene component and an elastomer component. The styrene elastomer contains the styrene component in a ratio of 5 to 80% by mass, preferably 10 to 50% by mass, more preferably 15 to 30% by mass. In this case, as the elastomer component, conjugated diene hydrocarbon such as butadiene, isoprene, 1,3-pentadiene and the like is exemplified. More specifically, a copolymer elastomer of styrene and butadiene (SBS), a copolymer elastomer of styrene and isoprene (SIS) and the like are exemplified.

The resin members 1, 2 may be produced by using the masterbatch of any thermoplastic resin composition which is colored. A resin which is a principal component of the above mentioned resin members 1, 2 and a base resin of the masterbatch may be the same or different each other. The masterbatch is obtained through any method. For example, the masterbatch is produced as follows. A powder and/or pellets of the base resin of the masterbatch and the coloring agent are mixed by using a mixing machine such as a tumbler and a super mixer. The resultant mixture is heated and melted by using an extruder, a batch-type kneader or a roll-type kneader, and is pelletized or grained to obtain the master batch.

The resin members 1, 2 may be molded through various steps which are publicly known. For example, the resin members 1, 2 are molded via using the colored pellets by a processing machine such as an extruder, an injection molding machine and a roll mill. Further, the resin members 1, 2 may be molded through following steps: obtaining a resin composition through mixing pellets and/or a powder of a transparent thermoplastic resin, a grinded coloring agent and optionally various additives by using an appropriate mixer, and molding the resin composition by using the processing machine. Furthermore, the resin members 1, 2 may be molded through following steps: adding a coloring agent into a monomer containing an appropriate catalyst for copolymerization; synthesizing any resin by polymerizing the resultant mixture; and molding the resultant resin by an appropriate method. As a molding method, following methods may be employed: injection molding, extrusion molding, compression molding, foam molding, blow molding, vacuum molding, injection blow molding, rotation molding, calender molding and solution casting. By employing the above molding, the variously shaped resin members 1, 2 may be obtained.

EMBODIMENTS

Embodiments of the present invention will be described in detail below, but the scope of the present invention is not restricted to these embodiments.

(Preparing a Black Coloring Agent Having Laser Beam Transmissivity)

[Coloring agent A] Coloring agent A was obtained by powder-mixing an anthraquinone blue color oil soluble dye (C.I. Solvent Blue 97), a perinone red color oil soluble dye (C.I. Solvent Red 179) and an anthraquinone yellow color oil soluble dye (C.I. Solvent Yellow 163) at a mass ratio of 5:3:2.

[Coloring agent B] Coloring agent B was obtained by powder-mixing an anthraquinone blue color oil soluble dye (C.I. Solvent Blue 104), a perinone red color oil soluble dye (C.I. Solvent Red 179) and an anthraquinone yellow color oil soluble dye (C.I. Solvent Yellow 163) at a mass ratio of 4:3:3.

[Coloring agent C] Coloring agent C was obtained by powder-mixing a salt-forming dye of an anthraquinone blue color acid dye (C.I Acid Blue 80) and hexamethylenediamine, a perinone red color oil soluble dye (C.I. Solvent Red 179) and an anthraquinone yellow color oil soluble dye (C.I. Solvent Yellow 163) at a mass ration of 7:2:1.

[Coloring agent D] Coloring agent D was obtained by powder-mixing a salt-forming dye of an anthraquinone blue color acid dye (C.I Acid Blue 80) and 2-ethylhexylamine, a perinone red color oil soluble dye (C.I. Solvent Red 179) and an anthraquinone yellow color oil soluble dye (C.I. Solvent Yellow 163) at a mass ration of 7:2:1.

[Coloring agent E] Coloring agent E was obtained by powder-mixing a salt-forming dye of an anthraquinone blue color acid dye (C.I Acid Blue 236) and 2-ethylhexylamine, a perinone red color oil soluble dye (C.I. Solvent Red 179) and an anthraquinone yellow color oil soluble dye (C.I. Solvent Yellow 163) at a mass ratio of 6:3:1.

[Coloring agent F] Coloring agent F was obtained by powder-mixing a salt-forming dye of an anthraquinone blue color acid dye (C.I Acid Blue 236) and hexamethylenediamine, a perinone red color oil soluble dye (C.I. Solvent Red 179) and an anthraquinone yellow color oil soluble dye (C.I. Solvent Yellow 163) at a mass ratio of 5:3:2.

Example 1-1

(1) Preparing a Laser-Weakly-Absorptive Resin Member (a First Resin Member)

A glass fiber reinforced polyamide (PA) 66 resin (available from Asahi Kasei Corp., LEONA (registered trademark) 14G33) in an amount of 499.85 g, 0.15 g of Nigrosine A (nigrosine sulfate synthesized by modifying a sulfate ion concentration in accordance with the description of Japanese Patent Publication No. 3757081; sulfate ion 1.96% by mass; volume resistivity $2.0 \times 10^{10}$ Ω·cm; C.I. Solvent Black 5) were put in a tumbler made of stainless steel, followed by stirring and mixing them for 1 hour. A resin composition for the laser-weakly-absorptive resin member was obtained. The resultant resin composition for the laser-weakly-absorptive resin member was put in an injection molding machine (manufactured by TOYO MACHINERY & METAL CO., LTD., tradename: Si-50), followed by molding it in the usual manner at 295° C. of a cylinder temperature and 80° C. of a mold temperature. One laser-weakly-absorptive resin member 1 having a size of 100 mm lateral length×80 mm longitudinal length×2 mm thickness and a square shape was obtained.

(2) Preparing a Laser-Absorptive Resin Member (a Second Resin Member)

One laser-absorptive resin member 2 was obtained in the same manner as in "Preparing a laser-weakly-absorptive resin member" except that an amount of the glass fiber reinforced PA 66 resin (LEONA 14G33) was 492.0 g and 8.0 g of Nigrosine A was used.

(Transmittance and Absorbance)

Transmittance and reflectance of the molded plates used for the laser-weakly-absorptive resin member 1 and the laser-absorptive resin member 2 were measured by using a spectrophotometer (manufactured by JASCO Corporation, tradename: V-570). Usual absorbance measured by dissolving a sample is a positive number calculated from the logarithm of the transmittance. The laser beam is reflected by a face of the molded plate. In the present invention, therefore, when the absorbance of the molded resin member is measured, true transmittance is needed. The true transmittance T is represented by $T = I_T/(I_O - I_R)$. The Lambert-Beer law representing the absorbance of 940 nm is represented by the following equation (1):

$$\text{Absorbance } a = -\text{Log } T = -\text{Log}\{I_T/(I_O - I_R)\} \quad (1)$$

(wherein T is the true transmittance; ($I_O$) is incident light intensity; ($I_T$) is transmissive light intensity; and ($I_R$) is reflected light intensity.) Herein, the absorbance was calculated as follows: setting incident light intensity $I_O$ of 100%; and entering the transmittance and the reflectance which are percentages of measured values into the transmissive light intensity $I_T$ and the reflected light intensity $I_R$, respectively.

Incidentally, when the laser-absorptive resin member 2 composing a laser welded body of the present invention excessively contains a laser beam absorbent, obtaining the absorbance and absorptivity by measurement may be difficult. Further, according to the Lambert-Beer law, the absorbance a is represented by the following equation (2) which is an equation showing a relationship between a laser beam absorbent content C (% by mass) and a thickness L of the resin member (mm):

$$\text{Absorbance } a = \varepsilon CL \quad (2)$$

(wherein ε is the absorptivity (1/mm); C is the laser beam absorbent content (% by mass); L is the thickness of the resin member (mm).) The transmittance and the reflectance of the glass fiber reinforced PA66 resin member (2 mm thickness) containing Nigrosine A as the laser beam absorbent were measured. Results shown in Table 1 were obtained. A calibration curve of the absorbance which is converted into 1 mm thickness was made from these results.

TABLE 1

| Nigrosine A content (% by mass) | Transmittance (%) | Reflectance (%) | Absorbance a (converted into 1 mm thickness) |
|---|---|---|---|
| 0 | 56.4 | 14.6 | 0.09 |
| 0.005 | 46.5 | 11.0 | 0.14 |
| 0.01 | 39.5 | 8.8 | 0.18 |
| 0.02 | 32.1 | 7.1 | 0.23 |
| 0.03 | 23.0 | 6.2 | 0.31 |
| 0.04 | 16.7 | 5.7 | 0.38 |

A graph plotting the obtained absorbance a along a vertical axis and the laser beam absorbent (Nigrosine A) content C (% by mass) corresponding thereto along a horizontal axis was made. The calibration curve represented by Absorbance $a = 6.055C + 0.087$ was obtained. By using the equation of the calibration curve, the absorbance was calculated from the laser beam absorbent content (% by mass). The absorbance a and the absorptivity per 1 mm thickness of the laser-absorptive resin member 2 containing the laser beam absorbent were obtained through dividing the obtained absorbance by the thickness of the resin member. As just described, the absorbance $a_2$ was obtained. Results were shown in Table 2.

(3) Producing a Laser Welded Body

As shown in FIGS. 1(a) and 1(b), a contacted part N was formed by overlapping the laser-weakly-absorptive resin member 1 and the laser-absorptive resin member 2. A laser beam L was output from a diode laser having 320 W output power [wave length: 940 nm, continuously] (manufactured by Hamamatsu Photonics K.K.). Radiation of the laser beam L was approximately and vertically performed relative to the face of the laser-weakly-absorptive resin member 1 from an upper direction thereof. The laser beam L moved at 200 mm/second of a scan speed and 80 mm of a scan distance so as to traverse from one of a long side of the resin members in a straight line. A laser welded body 10 of Example 1-1, in which the contacted part N was welded and the resin members 1, 2 were integrated, was obtained. The laser welded body 10 was evaluated as follows.

(Tensile Test)

In accordance with a test process in Japanese Industrial Standard K7161: 2014 Plastics-Determination of tensile properties, tensile strength as welding strength was measured by using a tensile tester (manufactured by SHIMADZU CORPORATION, tradename: AG-50kNE). The resin members 1, 2 of the welded body 10 were horizontally pulled along longitudinal direction and a direction separating these at 10 mm/minute of a test speed. A result was shown in Table 2.

(Evaluation of a Welded State)

An appearance of a part which was irradiated with the laser beam L was visually observed. A welded state was evaluated as follows. A result was shown in Table 2.

Excellent: The irradiated part of the laser welded body had no scorch marks and voids, and the result of the tensile test of the laser welded body was 500 N or more.

Good: The irradiated part thereof had scorch marks and voids, or the result of the tensile test thereof was less than 500 N.

Bad: It was not possible to perform laser-welding, and no laser welded body was obtained.

Example 1-2

(1) Preparing a Laser-Weakly-Absorptive Resin Member

The glass fiber reinforced PA 66 resin (LEONA 14G33) in an amount of 496.85 g, 0.15 g of Nigrosine B (nigrosine sulfate; sulfate ion 1.52% by mass; volume resistivity $2.7 \times 10^{10}$ $\Omega \cdot cm$) and 3.0 g of Coloring agent C were put in a tumbler made from stainless steel, followed by stirring and mixing them for 1 hour. A resin composition for a laser-weakly-absorptive resin member was obtained. The resultant resin composition for the laser-weakly-absorptive resin member was put in an injection molding machine, followed by molding it in the usual manner at 295° C. of a cylinder temperature and 80° C. of a mold temperature. One laser-weakly-absorptive resin member 1 having a size of 100 mm lateral length×length 80 mm longitudinal×2 mm thickness and a square shape was obtained.

(2) Preparing a Laser-Absorptive Resin Member

One laser-absorptive resin member 2 was obtained in the same manner as in Example 1-1 except that an amount of the glass fiber reinforced PA 66 resin (LEONA 14G33) was 490.0 g and 10.0 g of Nigrosine B was used instead of Nigrosine A.

The transmittances and the absorbances of the laser-weakly-absorptive resin member 1 and the laser-absorptive resin member 2 were measured in the same manner as in Example 1-1. The results were shown in Table 2.

(3) Producing a Laser Welded Body

A laser welded body 10 of Example 1-2 was produced in the same manner as in Example 1-1 except that the output power of the diode laser was 280 W. With respect to the obtained laser welded body 10, measuring the tensile strength and evaluating the welded state were performed in the same manner as in Example 1-1. Results were shown in Table 2.

Example 1-3

The laser-weakly-absorptive resin member 1 and the laser-absorptive resin member 2 were prepared in the same manner as in Example 1-1. With respect to the obtained resin members 1, 2, the transmittances and the absorbances were measured in the same manner as in Example 1-1. The results were shown in Table 2. Then, a laser welded body 10 of Example 1-3 was produced in the same manner as in Example 1-1 except that the output power of the diode laser was 270 W, and the scan speed was 150 mm/second. With respect to the obtained laser welded body 10, measuring the tensile strength and evaluating the welded state were performed in the same manner as in Example 1-1. The results were shown in Table 2.

Example 1-4

(1) Preparing a Laser-Weakly-Absorptive Resin Member

The glass fiber reinforced PA 66 resin (LEONA 14G33) in an amount of 496.85 g, 0.15 g of Nigrosine A and 3.0 g of Coloring agent F were put in a tumbler made from stainless steel, followed by stirring and mixing them for 1 hour. A resin composition for a laser-weakly-absorptive resin member was obtained. One laser-weakly-absorptive resin member 1 was obtained by molding the resultant resin composition for the laser-weakly-absorptive resin member in the same manner as in Example 1-1.

(2) Preparing a Laser-Absorptive Resin Member

One laser-absorptive resin member 2 was obtained in the same manner as in Example 1-1 except that an amount of the glass fiber reinforced PA 66 resin (LEONA 14G33) was 490.0 g and 10.0 g of Nigrosine A was used.

The transmittances and the absorbances of the laser-weakly-absorptive resin member 1 and the laser-absorptive resin member 2 were measured in the same manner as in Example 1-1. The results were shown in Table 2.

(3) Producing a Laser Welded Body

A laser welded body 10 of Example 1-4 was produced in the same manner as in Example 1-1 except that the output power of the diode laser was 160 W, and the scan speed was 100 mm/second. With respect to the obtained laser welded body 10, measuring the tensile strength and evaluating the welded state were conducted in the same manner as in Example 1-1. The results were shown in Table 2.

Comparative Example 1-1

The glass fiber reinforced PA 66 resin (LEONA 14G33) in an amount of 499.85 g, 0.15 g of nigrosine hydrochloride (available from ORIENT CHEMICAL INDUSTRIES CO., LTD., tradename: NUBIAN (registered trademark) BLACK NH-805, volume resistivity $8.0 \times 10^8$ $\Omega \cdot cm$, C.I. Solvent Black 5) were put in a tumbler made from stainless steel, followed by stirring and mixing them for 1 hour. A resin composition for a laser-weakly-absorptive resin member was obtained. One laser-weakly-absorptive resin member 1 was obtained by molding the resultant resin composition for the laser-weakly-absorptive resin member in the same manner as in Example 1-1. One laser-weakly-absorptive resin member 1 was obtained. Further, one laser-absorptive resin member 1 was obtained in the same manner as in Example 1-1. With respect to the obtained resin members the transmittances and the absorbances were measured in the same manner as in Example 1-1. The results were shown in Table 2. Then, a laser welded body of Comparative Example 1-1 was produced in the same manner as in Example 1-1 except that the output power of the diode laser was 270 W and the scan speed was 150 mm/second. With respect to the obtained laser welded body, measuring the tensile strength and evaluating the welded state were performed in the same manner as in Example 1-1. The results were shown in Table 2.

Example 1-5

(1) Preparing a Laser-Weakly-Absorptive Resin Member

One laser-weakly-absorptive resin member 1 was obtained in the same manner as in Example 1-1 except that an amount of the glass fiber reinforced PA 66 resin (LEONA 14G33) was 499.8 g and 0.2 g of Nigrosine A was used.

(2) Preparing a Laser-Absorptive Resin Member

One laser-absorptive resin member 2 was obtained in the same manner as in "Preparing a laser-weakly-absorptive resin member" except that an amount of the glass fiber reinforced PA 66 resin (LEONA 14G33) was 492.0 g and 8.0 g of Nigrosine A was used.

The transmittances and the absorbances of the laser-weakly-absorptive resin member 1 and the laser-absorptive resin member 2 were measured in the same manner as in Example 1-1. The results were shown in Table 2.

(3) Producing a Laser Welded Body

A laser welded body 10 of Example 1-5 was produced in the same manner as in Example 1-1 except that the output power of the diode laser was 330 W, and the scan speed was 150 mm/second. With respect to the obtained laser welded body 10, measuring the tensile strength and evaluating the welded state were performed in the same manner as in Example 1-1. The results were shown in Table 2.

Example 1-6

One laser-weakly-absorptive resin member 1 was obtained in the same manner as in Example 1-1 except that an amount of the glass fiber reinforced PA 66 resin (LEONA 14G33) was 499.8 g and 0.2 g of Nigrosine A was used. Also, one laser-absorptive resin member 2 was obtained in the same manner as in Example 1-1 except that an amount of the glass fiber reinforced PA 66 resin (LEONA 14G33) was 492.0 g and 8.0 g of nigrosine hydrochloride (NUBIAN BLACK NH-805) was used. With respect to the obtained resin members 1, 2, the transmittances and the absorbances were measured in the same manner as in Example 1-1. The results were shown in Table 2. Then, a laser welded body 10 of Example 1-6 was produced in the same manner as in Example 1-1 except that the output power of the diode laser was 330 W, and the scan speed was 150 mm/second. With respect to the obtained laser welded body 10, measuring the tensile strength and evaluating the welded state were conducted in the same manner as in Example 1-1. The results were shown in Table 2.

Comparative Example 1-2

One laser-weakly-absorptive resin member 1 was obtained in the same manner as in Comparative example 1-1 except that an amount of the glass fiber reinforced PA 66 resin (LEONA 14G33) was 499.8 g and 0.2 g of nigrosine hydrochloride (available from ORIENT CHEMICAL INDUSTRIES CO., LTD., tradename: NUBIAN (registered trademark) BLACK NH-805, C.I. Solvent Black 5) was used. Further, one laser-absorptive resin member was obtained in the same manner as in Comparative example 1-1 except that 8.0 g of nigrosine hydrochloride (NH-805) was used instead of nigrosine sulfate. With respect to the obtained resin members, the transmittances and the absorbances were measured in the same manner as in Example 1-1. The results were shown in Table 2. Then, a laser welded body of Comparative example 1-2 was produced in the same manner as in Example 1-1 except that the output power of the diode laser was 330 W, and the scan speed was 150 mm/second. With respect to the obtained laser welded body, measuring the tensile strength and evaluating the welded state were conducted in the same manner as in Example 1-1. The results were shown in Table 2.

Example 1-7

(1) Preparing a Laser-Weakly-Absorptive Resin Member

One laser-weakly-absorptive resin member 1 was obtained in the same manner as in Example 1-1 except that an amount of the glass fiber reinforced PA 66 resin (LEONA 14G33) was 499.9 g and 0.1 g of Nigrosine B (nigrosine sulfate; sulfate ion 1.52% by mass; volume resistivity 2.7× $10^{10}$ Ω·cm) was used instead of Nigrosine A.

(2) Preparing a Laser-Absorptive Resin Member

One laser-absorptive resin member 2 was obtained in the same manner as in Example 1-1 except that an amount of the glass fiber reinforced PA 66 resin (LEONA 14G33) was 490.0 g and 10.0 g of Nigrosine B was used instead of Nigrosine A.

The transmittances and the absorbances of the laser-weakly-absorptive resin member 1 and the laser-absorptive resin member 2 were measured in the same manner as in Example 1-1. The results were shown in Table 2.

(3) Producing a Laser Welded Body

A laser welded body 10 of Example 1-7 was produced in the same manner as in Example 1-1 except that the output power of the diode laser was 100 W, and the scan speed was 100 mm/second. With respect to the obtained laser welded body 10, measuring the tensile strength and evaluating the welded state were performed in the same manner as in Example 1-1. The results were shown in Table 2.

Example 1-8

(1) Preparing a Laser-Weakly-Absorptive Resin Member

The glass fiber reinforced PA 66 resin (LEONA 14G33) in an amount of 496.9 g, 0.1 g of Nigrosine C (nigrosine sulfate; sulfate ion 0.70% by mass; volume resistivity 0.9× $10^{10}$ Ω·cm) and 3.0 g of Coloring agent A were put in a tumbler made from stainless steel, followed by stirring and mixing them for 1 hour. A resin composition for a laser-weakly-absorptive resin member was obtained. One laser-weakly-absorptive resin member 1 was obtained by molding the resultant resin composition for the laser-weakly-absorptive resin member in the same manner as in Example 1-1.

(2) Preparing a Laser-Absorptive Resin Member

One laser-absorptive resin member 2 was obtained in the same manner as in Example 1-7 except that Nigrosine A was used instead of Nigrosine B.

The transmittances and the absorbances of the laser-weakly-absorptive resin member 1 and the laser-absorptive resin member 2 were measured in the same manner as in Example 1-1. The results were shown in Table 2.

(3) Producing a Laser Welded Body

A laser welded body 10 of Example 1-8 was produced in the same manner as in Example 1-1 except that the output power of the diode laser was 140 W, and the scan speed was 100 mm/second. With respect to the obtained laser welded body 10, measuring the tensile strength and evaluating the welded state were performed in the same manner as in Example 1-1. The results were shown in Table 2.

Comparative Example 1-3

The glass fiber reinforced PA 66 resin (LEONA 14G33) in an amount of 496.9 g, 0.1 g of nigrosine base (available from ORIENT CHEMICAL INDUSTRIES CO., LTD., tradename: NUBIAN (registered trademark) BLACK PA-9801, C.I. Solvent Black 7) and 3.0 g of Coloring agent A were put in a tumbler made from stainless steel, followed by stirring and mixing them for 1 hour. A resin composition for a laser-weakly-absorptive resin member was obtained. One laser-weakly-absorptive resin member 1 was obtained by molding the resultant resin composition for the laser-weakly-absorptive resin member in the same manner as in Example 1-1. Further, one laser-absorptive resin member was obtained in the same manner as in Comparative example 1-1 except that an amount of the glass fiber reinforced PA 66 resin (LEONA 14G33) was 490.0 g and 10.0 g of nigrosine base (NUBIAN (registered trademark) BLACK PA-9803) was used instead of Nigrosine A. With respect to the obtained resin members, the transmittances and the absorbances were measured in the same manner as in Example 1-1. The results were shown in Table 2. Then, a laser welded body of Comparative example 1-3 was produced in the same manner as in Example 1-1 except that the output power of the diode laser was 140 W, and the scan speed was 100 mm/second. With respect to the obtained laser welded body, measuring the tensile strength and evaluating the welded state were conducted in the same manner as in Example 1-1. The results were shown in Table 2.

Example 1-9

The laser-weakly-absorptive resin member 1 was prepared in the same manner as in Example 1-1. One laser-absorptive resin member 2 was obtained in the same manner as in Example 1-1 except that an amount of the glass fiber reinforced PA 66 resin (LEONA 14G33) was 488.0 g and 12.0 g of Nigrosine A was used. Then, the transmittances and the absorbances of the laser-weakly-absorptive resin member 1 and the laser-absorptive resin member 2 were measured in the same manner as in Example 1-1. Furthermore, a laser welded body 10 of Example 1-9 was produced in the same manner as in Example 1-1 except that the output power of the diode laser was 160 W, and the scan speed was 100 mm/second. With respect to the obtained laser welded body 10, measuring the tensile strength and evaluating the welded state were performed in the same manner as in Example 1-1. The measurement results and evaluation results were shown in Table 2.

TABLE 2

| | | Ex. 1-1 | Ex. 1-2 | Ex. 1-3 | Ex. 1-4 | Comp. ex. 1-1 | Ex. 1-5 | Ex. 1-6 |
|---|---|---|---|---|---|---|---|---|
| Laser-weakly-absorptive resin member (First resin member) | Glass fiber reinforced PA66 resin (g) | 499.85 | 496.85 | 499.85 | 496.85 | 499.85 | 499.8 | 499.8 |
| | Nigrosine | A | B | A | A | Nigrosine hydrochloride | A | A |
| | Nigrosine amount (g) | 0.15 | 0.15 | 0.15 | 0.15 | 0.15 | 0.2 | 0.2 |
| | Coloring agent | — | C | — | F | — | — | — |
| | Coloring agent amount (g) | — | 3 | — | 3 | — | — | — |
| | Transmittance (%) | 24.4 | 24.2 | 24.4 | 24.2 | 24.5 | 17.3 | 17.3 |
| | Absorbance $a_1$ | 0.58 | 0.60 | 0.58 | 0.60 | 0.58 | 0.74 | 0.74 |
| | Absorbance $a_1$ converted into 1 mm | 0.29 | 0.30 | 0.29 | 0.30 | 0.28 | 0.37 | 0.37 |
| Laser-absorptive resin member (Second resin member) | Glass fiber reinforced PA66 resin (g) | 492 | 490 | 492 | 490 | 492 | 492 | 492 |
| | Nigrosine | A | B | A | A | A | A | Nigrosine hydrochloride |
| | Nigrosine amount (g) | 8 | 10 | 8 | 10 | 8 | 8 | 8 |
| | Transmittance (%) | 0 | 0 | 0 | 0 | 0 | 0 | 0 |
| | Absorbance $a_2$ converted into 1 mm | 9.8 | 12.2 | 9.8 | 12.2 | 9.8 | 9.8 | 9.6 |
| Absorbance ratio $a_2/a_1$ | | 33.8 | 40.7 | 33.8 | 40.7 | 35.0 | 26.5 | 25.9 |
| Laser-welding | Output power (W) | 320 | 280 | 270 | 160 | 270 | 330 | 330 |
| | Scan speed (mm/sec.) | 200 | 200 | 150 | 150 | 150 | 150 | 150 |
| | Tensile strength (N) | 1522 | 1600 | 1572 | 1599 | 1152 | 1338 | 1256 |
| | Welded state | Exc. | Exc. | Exc. | Exc. | Exc. | Exc. | Exc. |

| | | Comp. ex. 1-2 | Ex. 1-7 | Ex. 1-8 | Comp. ex. 1-3 | Ex. 1-9 |
|---|---|---|---|---|---|---|
| Laser-weakly-absorptive resin member (First resin member) | Glass fiber reinforced PA66 resin (g) | 499.8 | 499.9 | 496.9 | 496.9 | 499.85 |
| | Nigrosine | Nigrosine hydrochloride | B | C | Nigrosine base | A |
| | Nigrosine amount (g) | 0.2 | 0.1 | 0.1 | 0.1 | 0.15 |
| | Coloring agent | — | — | A | A | — |
| | Coloring agent amount (g) | — | — | 3 | 3 | — |
| | Transmittance (%) | 17.2 | 33.8 | 33.5 | 33.9 | 24.4 |
| | Absorbance $a_1$ | 0.72 | 0.44 | 0.48 | 0.42 | 0.58 |
| | Absorbance $a_1$ converted into 1 mm | 0.36 | 0.22 | 0.24 | 0.21 | 0.29 |

TABLE 2-continued

| | | | | | | |
|---|---|---|---|---|---|---|
| Laser-absorptive resin member (Second resin member) | Glass fiber reinforced PA66 resin (g) | 492 | 490 | 490 | 490 | 488 |
| | Nigrosine | Nigrosine hydro-chloride | B | A | Nigrosine base | A |
| | Nigrosine amount (g) | 8 | 10 | 10 | 10 | 12 |
| | Transmittance (%) | 0 | 0 | 0 | 0 | 0 |
| | Absorbance $a_2$ converted into 1 mm | 9.6 | 12.2 | 12.2 | 12.2 | 14.2 |
| Absorbance ratio $a_2/a_1$ | | 26.7 | 55.5 | 50.8 | 58.0 | 49.0 |
| Laser-welding | Output power (W) | 330 | 100 | 140 | 140 | 160 |
| | Scan speed (mm/sec.) | 150 | 100 | 100 | 100 | 100 |
| | Tensile strength (N) | 1082 | 1556 | 1635 | 1463 | 1632 |
| | Welded state | Exc. | Exc. | Exc. | Exc. | Exc. |

As shown in Table 2, the laser welded bodies of Examples and Comparative examples had practical appearance due to having excellent gloss and good appearance in jet black. The tensile strengths of the laser welded body of Examples were higher than that of Comparative examples.

Example 2-1

(1) Preparing a Laser-Weakly-Absorptive Resin Member

A polyamide (PA) 66 resin (available from Asahi Kasei Corp., tradename: LEONA (registered trademark) 1300S) in an amount of 499.8 g, 0.2 g of Nigrosine A (nigrosine sulfate synthesized by modifying a sulfate ion concentration in accordance with description of Japanese Patent Publication No. 3757081; sulfate ion 1.96% by mass; volume resistivity $2.0 \times 10^{10}$ Ω·cm; C.I. Solvent Black 5) were put in a tumbler made from stainless steel, followed by stirring and mixing them for 1 hour. A resin composition for a laser-weakly-absorptive resin member was obtained. The resultant resin composition for the laser-weakly-absorptive resin member was put in an injection molding machine (manufactured by TOYO MACHINERY & METAL CO., LTD., tradename: Si-50), followed by molding it in the usual manner at 290° C. of a cylinder temperature and 80° C. of a mold temperature. One laser-weakly-absorptive resin member 1 having a size of 80 mm lateral length×50 mm longitudinal length×1.5 mm thickness and a square shape was obtained.

(Melt Flow Rate)

The laser-weakly-absorptive resin member 1 was cut to a predetermined size, and dried at 80° C. for 15 hours to prepare a measurement sample. In accordance with Japanese Industrial Standard K 7210: 2014 (Plastics-Determination of the melt mass-flow rate (MFR) and melt volume-flow rate (MVR) of thermoplastics), by using a F-F01 type melt indexer (manufactured by Toyo Seiki Seisaku-sho, Ltd., tradename), a measurement was performed under conditions of 280° C. of a test temperature and 2.16 kgf of a test load. The measurement was performed three times, and the average of obtained values was calculated to determine the melt flow rate. The melt flow rate of the laser-weakly-absorptive resin member 1 as the first resin member was 14.8 g/10 minutes.

(2) Preparing a Laser-Absorptive Resin Member

One laser-absorptive resin member 2 was obtained in the same manner as in "Preparing a laser-weakly-absorptive resin member" except that an amount of the glass fiber reinforced PA 66 resin (LEONA 1300S) was 496.0 g and 4.0 g of Nigrosine A was used.

The transmittance and the reflectance of the PA66 resin member containing Nigrosine A as the laser beam absorbent were measured. The results shown in Table 3 were obtained. Based on the results, a calibration curve was prepared in the same manner as in Example 1-1.

TABLE 3

| Nigrosine A content (% by mass) | Trans-mittance (%) | Reflectance (%) | Resin member thickness (mm) | Absorbance a (converted into 1 mm thickness) |
|---|---|---|---|---|
| 0 | 80.3 | 9.6 | 1.05 | 0.05 |
| 0.005 | 77.2 | 10.0 | 1.05 | 0.07 |
| 0.02 | 68.6 | 8.2 | 1.05 | 0.12 |
| 0.03 | 61.8 | 7.6 | 1.02 | 0.18 |
| 0.04 | 52.6 | 7.0 | 1.02 | 0.24 |
| 0.06 | 39.2 | 5.9 | 1.05 | 0.36 |
| 0.08 | 32.2 | 5.3 | 1.05 | 0.45 |
| 0.1 | 26.5 | 5.2 | 1.05 | 0.53 |
| 0.15 | 16.1 | 4.7 | 1.05 | 0.74 |
| 0.2 | 9.8 | 4.8 | 1.05 | 0.94 |

A graph plotting the obtained absorbance a along a vertical axis and the laser beam absorbent (Nigrosine A) content C (% by mass) corresponding thereto along a horizontal axis was made. The calibration curve represented by Absorbance a=4.538C+0.058 was obtained. By using the equation of the calibration curve, the absorbance was calculated from the laser beam absorbent content (% by mass). The absorbance a and the absorptivity per 1 mm thickness of the resin member containing the laser beam absorbent were obtained through dividing the obtained absorbance by the thickness of the resin member. As just described, the absorbance $a_1$ of the laser-weakly-absorptive resin member and the absorbance $a_2$ of the laser-absorptive resin member in Example 2-1 were obtained. In the result, the transmittance of the laser-weakly-absorptive resin member 1 was 52.6% the absorbance $a_1$ (converted into 1 mm thickness) thereof was 0.24. Further, the transmittance of the laser-absorptive resin member 2 was 0% the absorbance $a_2$ (converted into 1 mm thickness) thereof was 3.7. The absorbance ratio $a_2/a_1$ was 15.4.

(3) Producing a Laser Welded Body

As shown in FIGS. 1(a) and 1(b), a contacted part N was formed by overlapping the laser-weakly-absorptive resin member 1 and the laser-absorptive resin member 2. A laser beam L was output from a diode laser having 30 W output power [wave length: 940 nm, continuously] (manufactured by FINE DEVICE CO., LTD.). The radiation of the laser beam L was approximately and vertically performed with respect to the face of the laser-weakly-absorptive resin member 1 from an upper direction thereof. The laser beam L moved at 40 mm/second of a scan speed and 30 mm of a scan distance so as to traverse from one of a long side of the resin members in a straight line. A laser welded body 10 of Example 2-1, in which the contacted part N was welded and the resin members 1, 2 were integrated, was obtained. With respect to the laser welded body 10, measuring the tensile strength and evaluating the welded state were performed in the same manner as in Example 1-1. The tensile strength was 1503 N and the welded state was Excellent.

Example 2-2

(1) Preparing a Laser-Weakly-Absorptive Resin Member

One laser-weakly-absorptive resin member 1 was obtained in the same manner as in Example 2-1 except that an amount of PA 66 resin (LEONA 1300S) was 499.7 g and 0.3 g of Nigrosine A was used. The transmittance, the absorbance and the melt flow rate of the laser-weakly-absorptive resin member 1 were measured in the same manner as in Example 2-1. The transmittance was 39.2%, the absorbance $a_1$ (converted into 1 mm thickness) was 0.36, and the melt flow rate was 14.5 g/10 minutes.

(2) Preparing a Laser-Absorptive Resin Member (Second Resin Member)

One laser-absorptive resin member 2 was obtained in the same manner as in preparing a laser-weakly-absorptive resin member except that an amount of PA 66 resin (LEONA 1300S) was 496.0 g and 4.0 g of Nigrosine A was used. The transmittance and the absorbance of the laser-absorptive resin member 2 were measured in the same manner as in Example 2-1. The transmittance was 0%, the absorbance $a_2$ (converted into 1 mm thickness) was 3.7, and the absorbance ratio $a_2/a_1$ was 10.3.

(3) Producing a Laser Welded Body

A laser welded body 10 of Example 2-2 was produced in the same manner as in Example 2-1. With respect to the obtained laser welded body 10, measuring the tensile strength and evaluating the welded state were performed in the same manner as in Example 1-1. The tensile strength was 1543 N and the welded state was Excellent.

Figure 5:
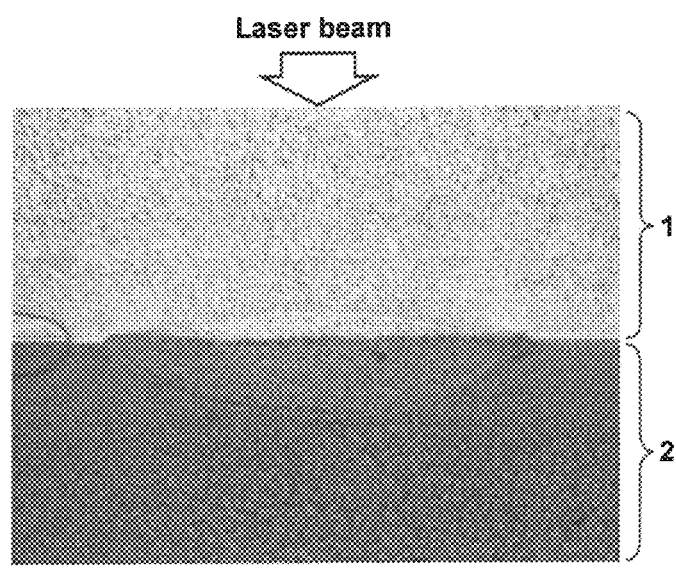
FIGS. 5(a) and 5(b) are cross sectional enlarged photographs showing a laser welded body of Examples 2-1 and 2-2 to which the present invention was applied.
Figure 5:
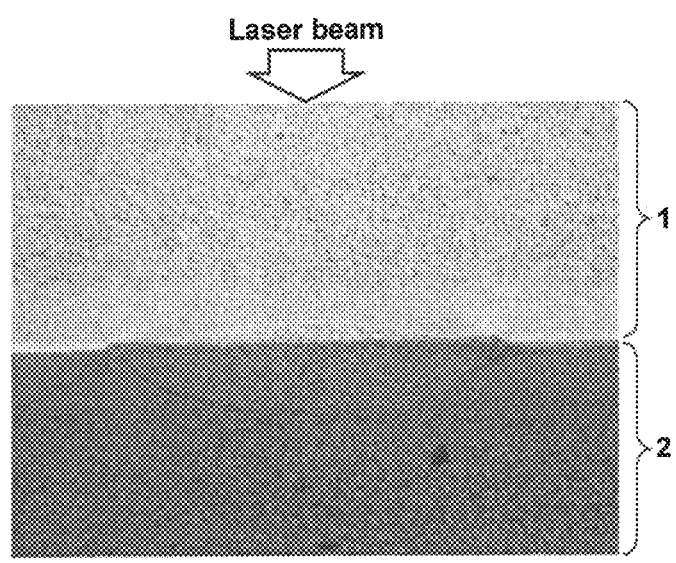

A cross-sectionally enlarged photograph of a melted part of the laser welded body 10 produced in Example 2-1 and that of the laser welded body 10 produced in Example 2-2 are shown in FIGS. 5(*a*) and 5(*b*), respectively. Incidentally, hollow arrows therein show a direction of radiation of the laser beam. By irradiating with the laser beam, the laser-weakly-absorptive resin member 1 and the laser-absorptive resin member 2 are welded and integrated at the contacted part which is an interface of which these are overlapped, without voids and scorch marks. A melted part formed by irradiating with the laser beam is radially spread to each of the laser-weakly-absorptive resin member 1 and the laser-absorptive resin member 2 across the contacted part. With respect to a size of the melted part, the laser-absorptive resin member 2 side is larger than the laser-weakly-absorptive resin member 1 side. Poor appearance such as scorch marks and a color change was not observed on the surface of the laser-weakly-absorptive resin member 1 located on a laser-irradiated side.

Example 3

(1) Preparing a Laser-Weakly-Absorptive Resin Member

The polyamide (PA) 66 resin (available from Asahi Kasei Corp., tradename: LEONA (registered trademark) 1300S) in an amount of 499.85 g, 0.15 g of Nigrosine A were put in a tumbler made from stainless steel, followed by stirring and mixing them for 1 hour. A resin composition for a laser-weakly-absorptive resin member was obtained. The resultant resin composition for the laser-weakly-absorptive resin member was put in an injection molding machine, followed by molding it in the usual manner at 290° C. of a cylinder temperature and 80° C. of a mold temperature. One first laser-weakly-absorptive resin member piece 1*a* and one second laser-weakly-absorptive resin member piece 1*b* having a size of 80 mm lateral length×50 mm longitudinal length×1.5 mm thickness and a square shape was obtained. The transmittance, the absorbance and the melt flow rate of the laser-weakly-absorptive resin member piece 1*a*, 1*b* were measured in the same manner as in Example 2-1. The transmittance was 61.8%, the absorbance $a_{1-2}$, $a_{1-2}$ (converted into 1 mm thickness) was 0.18, and the melt flow rate was 14.2 g/10 minutes.

(2) Preparing a Laser-Absorptive Resin Member

One laser-absorptive resin member 2 was obtained in the same manner as in "Preparing a laser-weakly-absorptive resin member" except that an amount of the PA 66 resin (LEONA 1300S) was 492.0 g and 8.0 g of Nigrosine A was used. The transmittance and the absorbance of the laser-absorptive resin member 2 were measured in the same manner as in Example 2-1. The transmittance was 0%, the absorbance $a_2$ (converted into 1 mm thickness) was 7.3, and the absorbance ratio $a_2/a_1$ was 40.5.

(3) Producing a Laser Welded Body

As shown in FIG. 2(*b*), a butted part B was formed by butting respective edge parts of the laser-weakly-absorptive resin member pieces 1*a*, 1*b* which is the laser-weakly-absorptive resin member 1. A contacted part $N_{1a-2}$ which is a contacted face the laser-weakly-absorptive resin member piece 1*a* and the laser-absorptive resin member 2 and a contacted part $N_{1b-2}$ which is a contacted face the laser-weakly-absorptive resin member piece 1*b* and the laser-absorptive resin member 2 was formed by putting the laser-absorptive resin member 2 on the both laser-weakly-absorptive resin member pieces 1*a*, 1*b* so as to overlap to the butted part B. A laser beam L was output from a diode laser having 50 W output power [wave length: 940 nm, continuously] (manufactured by FINE DEVICE CO., LTD., tradename: FD-200). The laser beam L was approximately and vertically aimed from an upper direction of the laser-weakly-absorptive resin member 1 toward the butted part B. The laser beam L moved at 40 mm/second of a scan speed and 30 mm of a scan distance along the butted part B in a straight line. A laser welded body 10 of Example 3, in which the butted part B and the contacted parts $N_{1a-2}$, $N_{1b-2}$ were welded and the both resin members 1, 2 were integrated, was obtained. With respect to the obtained laser welded body 10, the tensile strength was measured in the same manner as in Example 1-1 except for horizontally pulling along a direction in which the first laser-weakly-absorptive resin member piece 1*a* and the second laser-weakly-absorptive resin member piece 1*b* were separated. Further, the welded state was evaluated in the same manner as in Example 1-1. Consequently, the tensile strength was 978 N, and the welded state was Excellent.

Example 4-1

(1) Preparing a Laser-Weakly-Absorptive Resin Member

The polyamide (PA) 66 resin (available from Asahi Kasei Corp., tradename: LEONA (registered trademark) 1300S) in an amount of 495.8 g, 0.2 g of Nigrosine A and 4.0 g of Coloring agent A were put in a tumbler made from stainless steel, followed by stirring and mixing them for 1 hour. A resin composition for a laser-weakly-absorptive resin member was obtained. The resultant resin composition for the laser-weakly-absorptive resin member was put in an injection molding machine, followed by molding it in the usual manner at 290° C. of a cylinder temperature and 80° C. of a mold temperature. A lid 3 which was the laser-weakly-absorptive resin member and was shown in FIG. 6(*a*), a perspective view, was produced. The lid 3 had a head part 3*a* having a disk shape and a sleeve part 3*b* having a cylindrical shape coaxially aligned therewith. An outer dimension of the head part 3*a* was 50 mm outer diameter×2 mm thickness. An outer dimension of the sleeve part 3*b* was 42 mm outer diameter×4 mm height. The lid 3 had a stepped part 3*c* having 4 mm width at a circumference face thereof due to an outer diameter difference between the head part 3*a* and the sleeve part 3*b*.

(2) Preparing a Laser-Absorptive Resin Member

The polyamide (PA) 66 resin (available from Asahi Kasei Corp., tradename: LEONA (registered trademark) 1300S) in an amount of 490.0 g, 10.0 g of Nigrosine A and 5.0 g of Coloring agent C were put in a tumbler made from stainless steel, followed by stirring and mixing them for 1 hour. A resin composition for a laser-absorptive resin member obtained. The resultant resin composition for the laser-absorptive resin member was put in an injection molding machine, followed by molding it in the usual manner at 290° C. of a cylinder temperature and 80° C. of a mold temperature. A cylindrical container 4 shown in FIG. 6(*a*) was produced. The cylindrical container 4 had a bottom part having a circular shape, a circumferential wall erecting at the circumference of the bottom part toward an upper direction and an opening edge 4*a* opening at an upper end of the circumferential wall. An outer dimension of the cylindrical container 4 was 50 mm outer diameter×35 mm height. An inner dimension thereof was 43 mm inner diameter×32 mm height. The cylindrical container 4 had 3 mm of a wall thickness.

(3) Producing a Laser Welded Body

Figure 6A:
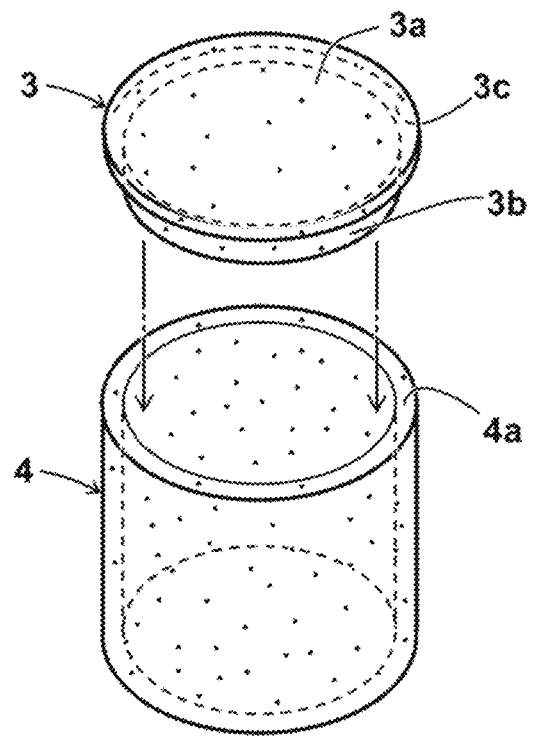
FIGS. 6(a) and 6(b) are a perspective view and a partially enlarged cross sectional view showing a method for producing a laser welded body of Examples 4-1 and 4-2 to which the present invention was applied.
Figure 6B:
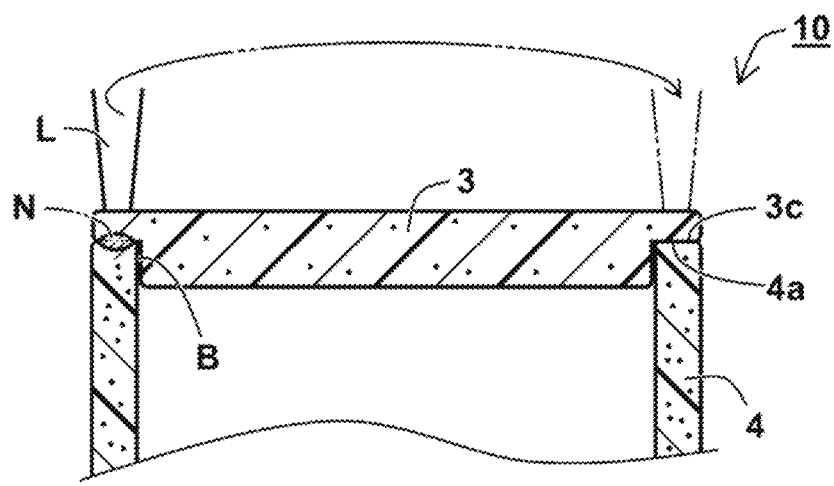
Figure 7:
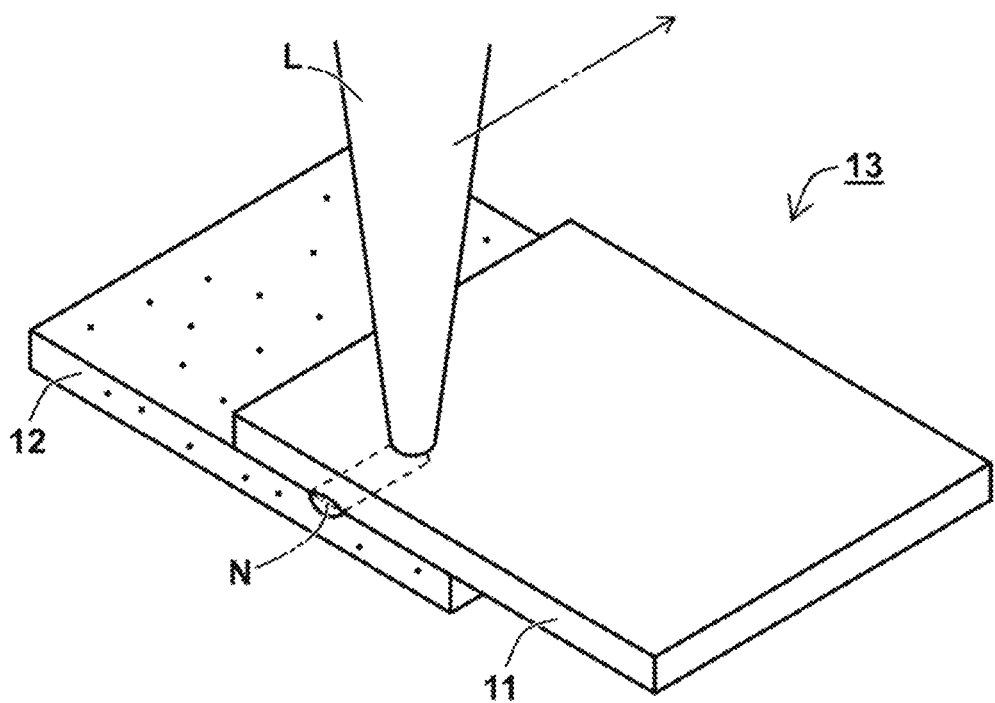
FIG. 7 is a perspective view showing a method for producing a conventional laser welded body outside the present invention.

The sleeve part 3*b* of the lid 3 was inserted from the opening edge 4*a* into a cavity of the cylindrical container 4. The lid 3 and the cylindrical container 4 were fitted by holding with hands. As shown in FIG. 6(*b*), a partially-enlarged longitudinal cross-sectional view, showing the lid 3 and the cylindrical container 4, a contacted part N, where the stepped part 3*c* and the opening edge 4*a* overlapped and made contact, and a butted part B, where the sleeve part 3*b* and an inner wall of the cylindrical container 4 were butted, were formed. The butted part B had a part, where the sleeve part 3*b* and the inner wall of the cylindrical container 4 made contact, and a part having looseness (interspace) therebetween, because there were a difference of the dimensions between the outer diameter of the sleeve part 3*b* and the inner diameter of the cylindrical container 4, and a deviation between respective central axises of the lid 3 and the cylindrical container 4 which were fitted each other.

A laser beam L was output from the diode laser having 50 W output power [wave length: 940 nm, continuously]. The laser beam L was approximately and vertically aimed relative to the face of the lid 3 from an upper direction thereof toward the butted part B so as to draw a circle along the butted part B. A scan speed of the laser beam L was 10 mm/second. In the result, a laser welded body 10 of Example 4-1 in which the butted part B was welded and the lid 3 and the cylindrical container 4 were integrated was obtained.

Example 4-2

(1) Preparing a Laser-Weakly-Absorptive Resin Member

The PA 66 resin (LEONA 1300S) in an amount of 499.7 g, 0.3 g of Nigrosine C were put in a tumbler made from stainless steel, followed by stirring and mixing them for 1 hour. A resin composition for a laser-weakly-absorptive resin member was obtained. By using the resultant resin composition for the laser-weakly-absorptive resin member, a lid 3 was prepared in the same manner as in Example 4-1.

(2) Preparing a Laser-Absorptive Resin Member

The PA 66 resin (LEONA 1300S) in an amount of 490.0 g, 10.0 g of Nigrosine C and 5.0 g of Coloring agent C were put in a tumbler made from stainless steel, followed by stirring and mixing them for 1 hour. A resin composition for a laser-absorptive resin member was obtained. By using the resultant resin composition for the laser-absorptive resin member, a cylindrical container 4 was prepared in the same manner as in Example 4-1.

(3) Producing a Laser Welded Body

In the same manner as in Example 4-1, the lid 3 and the cylindrical container 4 were fitted, the contacted part N, where the stepped part 3*c* and the opening edge 4*a* were overlapped, and the butted part B, where the sleeve part 3*c* and the inner wall of the cylindrical container 4 were butted, were formed. Then, a laser welded body 10 of Example 4-2 in the same manner as in Example 4-1.

In the laser welded bodies of the Example 4-1 and 4-2, the lid 3 which is the laser-weakly-absorptive resin member and the cylindrical container 4 which is the laser-absorptive resin member were welded air-tightly with high strength.

Example 5-1

(1) Preparing a Laser-Weakly-Absorptive Resin Member

A glass fiber reinforced polyamide (PA) 66 resin (available from E.I. du Pont de Nemours and Company, tradename: ZYTEL (registered trademark) 70G33L) in an amount of 499.9 g, 0.1 g of Nigrosine A were put in a tumbler made from stainless steel, followed by stirring and mixing them for 1 hour. A resin composition for a laser-weakly-absorptive resin member was obtained. The resultant resin composition for the laser-weakly-absorptive resin member was put in an injection molding machine (manufactured by TOYO MACHINERY & METAL CO., LTD., tradename: Si-50), followed by molding it in the usual manner at a cylinder temperature of 290° C. and a mold temperature of 90° C. One laser-weakly-absorptive resin member 1 having a size of 80 mm lateral length×50 mm longitudinal length×2 mm thickness and a square shape was obtained. The absorbance $a_1$ was obtained in the same manner as in Example 1-1. The results were shown in Table 4.

(2) Preparing a Laser-Absorptive Resin Member

One laser-absorptive resin member 2 was obtained in the same manner as in "Preparing a laser-weakly-absorptive resin member" except that an amount of the glass fiber reinforced PA 66 resin (ZYTEL 70G33L) was 498.35 g and 1.65 g of Carbon black A (Basic carbon black with 16 nm of the primary particle size, 260 m$^2$/g of the nitrogen adsorption specific surface area, and 66 ml/100 g of a DBP absorption) was used instead of Nigrosine A.

(Transmittance and Absorbance)

In order to the transmittance and the reflectance of the above laser-absorptive resin member 2 containing the carbon black as the laser beam absorbent, multiple kinds of molded plates varying an amount the carbon black and having a size of 80 mm lateral length×50 mm longitudinal length×1 mm thickness were prepared. The transmittance and the reflectance of the molded plates were measured in the same manner as in Example 1-1. A graph plotting the obtained absorbance a along a vertical axis and the laser beam absorbent (Carbon black A) content C (% by mass) corresponding thereto along a horizontal axis was made. A calibration curve with respect to the absorbance of the carbon black was obtained. The obtained calibration curve was represented by Absorbance a=29.4C+0.263. The transmittance and the absorbance $a_2$ (converted into 1 mm thickness) of the laser-absorptive resin member 2 obtained from the calibration curve were shown in Table 4.

(3) Producing a Laser Welded Body

A laser welded body 10 of Example 5-1 was produced in the same manner as in Example 1-1 except that the output power of the diode laser was 60 W and the scan speed was 100 mm/second. With respect to the obtained laser welded body 10, measuring the tensile strength and evaluating the welded state were performed in the same manner as in Example 1-1. The results were shown in Table 4.

Comparative Example 5-1

One laser-weakly-absorptive resin member 1 was obtained in the same manner as in Example 5-1 except that nigrosine hydrochloride (available from ORIENT CHEMICAL INDUSTRIES CO., LTD., tradename: NUBIAN (registered trademark) BLACK NH-805, C.I. Solvent Black 5) was used instead of Nigrosine A. One laser-absorptive resin member 2 was obtained in the same manner as in Example 5-1. Further, the transmittances and the absorbances of the resin members 1, 2 were measured in the same manner as in Example 5-1.

A laser welded body of Comparative Example 5-1 was produced in the same manner as in Example 5-1. With respect to the obtained laser welded body, measuring the tensile strength and evaluating the welded state were conducted in the same manner as in Example 1-1. The measurement resultants and an evaluation result were shown in Table 4.

Examples 5-2 and 5-3, and Comparative Example 5-2

Laser welded bodies of Examples 5-2 and 5-3, and Comparative example 5-2 were produced in the same manner as in Example 5-1 except that resin amounts, kinds and amounts of the laser beam absorbent, kinds and amounts of the coloring agent, output power of the diode laser and scan speeds were altered as shown in Table 4. Incidentally, Coloring agent s B and C were the same as shown in Table 2.

Example 5-4

One laser-weakly-absorptive resin member 1 was prepared in the same manner as in Example 5-1 except that an amount of the glass fiber reinforced PA 66 resin (ZYTEL 70G33L) was 499.85 g and 0.15 g of Nigrosine C (nigrosine sulfate; sulfate ion 0.70% by mass; volume resistivity 0.9× $10^{10}$ Ω·cm) was used instead of Nigrosine A. Further, one laser-absorptive resin member 2 was prepared in the same manner as in Example 5-1 except that an amount of the glass fiber reinforced PA 66 resin (ZYTEL 70G33L) was 497.95 g and 2.05 g of Carbon black B (Basic carbon black with 18 nm of the primary particle size, 180 $m^2$/g of the nitrogen adsorption specific surface area, and 46 ml/100 g of the DBP absorption) was used instead of Carbon black A. Furthermore, the transmittances and the absorbances of the resin members 1, 2 were measured in the same manner as in Example 5-1. Then, a laser welded body of Example 5-4 was produced in the same manner as in Example 5-1. Measuring the tensile strength and evaluating the welded state were conducted in the same manner as in Example 1-1. The measurement resultants and evaluation results were shown in Table 4.

Example 5-5

One laser-weakly-absorptive resin member 1 was prepared in the same manner as in Example 5-1 except that an amount of the glass fiber reinforced PA 66 resin (ZYTEL 70G33L) was 497.85 g, 0.15 g of Nigrosine B was used instead of Nigrosine A and 2.0 g of Coloring agent C. Further, one laser-absorptive resin member 2 was prepared in the same manner as in Example 5-1 except that an amount of the glass fiber reinforced PA 66 resin (ZYTEL 70G33L) was 497.95 g and 2.05 g of Carbon black C (Basic carbon black with 24 nm of the primary particle size, 120 $m^2$/g of the nitrogen adsorption specific surface area, and 46 ml/100 g of the DBP absorption) was used instead of Carbon black A. Furthermore, the transmittances and the absorbances of the resin members 1, 2 were measured in the same manner as in Example 5-1. Then, a laser welded body of Example 5-5 was produced in the same manner as in Example 5-1 except that the output power of the diode laser was 50 W. Measuring the tensile strength and evaluating the welded state were conducted in the same manner as in Example 1-1. The measurement resultants and evaluation results were shown in Table 4.

TABLE 4

| | | Example | | | | | Comp. example | |
|---|---|---|---|---|---|---|---|---|
| | | 5-1 | 5-2 | 5-3 | 54 | 5-5 | 5-1 | 5-2 |
| Laser-weakly-absorptive resin member (First resin member) | Glass fiber reinforced PA66 resin (g) | 499.9 | 499.9 | 497.9 | 499.85 | 497.85 | 499.9 | 500 |
| | Nigrosine | A | A | A | C | B | Nigrosine hydrochloride | — |
| | Nigrosine amount (g) | 0.1 | 0.1 | 0.1 | 0.15 | 0.15 | 0.1 | — |
| | Coloring agent | — | — | B | — | C | — | — |
| | Coloring agent amount (g) | — | — | 2 | — | 2 | — | — |
| | Transmittance (%) | 34.9 | 34.9 | 34.7 | 18.2 | 18.0 | 35.1 | 59.8 |

TABLE 4-continued

|  |  | Example | | | | | Comp. example | |
| --- | --- | --- | --- | --- | --- | --- | --- | --- |
|  |  | 5-1 | 5-2 | 5-3 | 54 | 5-5 | 5-1 | 5-2 |
|  | Absorbance $a_1$ | 0.42 | 0.42 | 0.46 | 0.72 | 0.76 | 0.38 | 0.16 |
|  | Absorbance $a_1$ converted into 1 mm | 0.21 | 0.21 | 0.23 | 0.36 | 0.38 | 0.19 | 0.08 |
| Laser-absorptive resin member (Second resin member) | Glass fiber reinforced PA66 resin (g) | 498.35 | 497.95 | 498.35 | 497.95 | 497.95 | 498.35 | 498.35 |
|  | Carbon black | A | A | A | B | C | A | A |
|  | Carbon black amount (g) | 1.65 | 2.05 | 1.65 | 2.05 | 2.05 | 1.65 | 1.65 |
|  | Transmittance (%) | 0 | 0 | 0 | 0 | 0 | 0 | 0 |
|  | Absorbance $a_2$ converted into 1 mm | 10.0 | 12.3 | 10.0 | 12.3 | 12.3 | 10.0 | 10.0 |
| Absorbance ratio $a_2/a_1$ |  | 47.6 | 58.6 | 43.5 | 34.2 | 32.4 | 52.6 | 125 |
| Laser-welding | Output power (W) | 60 | 60 | 50 | 60 | 50 | 60 | 50 |
|  | Scan speed (mm/sec.) | 100 | 100 | 100 | 100 | 100 | 100 | 100 |
|  | Tensile strength (N) | 1392 | 1526 | 1345 | 1526 | 1190 | 1137 | 832 |
|  | Welded state | Excellent | Excellent | Excellent | Excellent | Excellent | Excellent | Good (Scorch) |

As seen from Table 4, the laser welded bodies of Examples had good appearances. The laser welded body of Comparative example had scorch marks at an irradiated part. The laser welded body using the laser-weakly-absorptive resin member 1 containing the nigrosine sulfate had a jet-black color, more excellent gloss and aesthetic appearance. In contrast, the values of the tensile strengths of Examples were higher than that of Comparative examples. Carbon blacks A and B had a high black degree of blackness and were well dispersed in the laser-absorptive resin member 2.

Example 6

One laser-weakly-absorptive resin member 1 was prepared in the same manner as in Example 1-1. Further, one laser-absorptive resin member 2 was prepared in the same manner as in preparing a laser-weakly-absorptive resin member 1 except that an amount of the glass fiber reinforced PA 66 resin (LEONA 14G33) was 495.0 g, 4.0 g of Nigrosine A and 1.0 g of Carbon black A was used. The transmittances and the absorbances of the resin members 1, 2 were measured in the same manner as in Example 1-1. The transmittance of the laser-weakly-absorptive resin member 1 was 24.4% and the absorbance $a_1$ (converted into 1 mm thickness) was 0.29. The transmittance of the laser-absorptive resin member 2 was 0% and the absorbance $a_2$ (converted into 1 mm thickness) was 11.1. The absorbance ratio $a_2/a_1$ was 61.7.

A laser welded body 10 of Example 6 was produced in the same manner as in Example 1-1 except that the output power of the diode laser was 140 W, and the scan speed was 100 mm/second. With respect to the obtained laser welded body 10, measuring the tensile strength and evaluating the welded state were conducted in the same manner as in Example 1-1. Consequently, the tensile strength was 1378 N and the welded state was Excellent.

Comparative Example 6

One laser-weakly-absorptive resin member 1 was prepared in the same manner as in Example 6 except that an amount of the glass fiber reinforced PA 66 resin (LEONA 14G33) was 499.75 g and 0.25 g of nigrosine hydrochloride (NUBIAN BLACK NH-805) was used instead of Nigrosine A. Further, one laser-absorptive resin member 2 was prepared in the same manner as in Example 6. With respect to the obtained resin members 1, 2, the transmittances and the absorbances were measured in the same manner as in Example 1-1. The transmittance of the laser-weakly-absorptive resin member 1 was 45.6% and the absorbance $a_1$ (converted into 1 mm thickness) was 0.30. The transmittance of the laser-absorptive resin member 2 was 0% and the absorbance $a_2$ (converted into 1 mm thickness) was 11.1. The absorbance ratio $a_2/a_1$ was 37.0. Then, a laser welded body of Comparative example 6 was produced in the same manner as in Example 6. With respect to the obtained laser welded body, measuring the tensile strength and evaluating the welded state were conducted in the same manner as in Example 1-1. Consequently, the tensile strength was 988 N and the welded state was Excellent.

Example 7

(1) Preparing a Laser-Weakly-Absorptive Resin Member

Non-fiber reinforced polyamide resin 9T (available from Kuraray Co., Ltd., tradename: Genestar (registered trademark) N1000A) in an amount of 499.9 g, 0.1 g of Nigrosine A were put in a tumbler made from stainless steel, followed by stirring and mixing them for 1 hour. A resin composition for a laser-weakly-absorptive resin member was obtained. The resultant resin composition for the laser-weakly-absorptive resin member was put in an injection molding machine (manufactured by TOYO MACHINERY & METAL CO., LTD., tradename: Si-50), followed by molding it in the usual manner at a cylinder temperature of 320° C. and a mold temperature of 135° C. One laser-weakly-absorptive resin member 1 having a size of 100 mm lateral length×80 mm longitudinal length×2 mm thickness and a square shape was obtained. A calibration curve for determining the absorbance a was prepared in the same manner as in Example 1-1. The transmittance of the weakly laser-absorbing resin member 1 obtained on the basis thereof is 55.2% and the absorbance $a_1$ (converted into 1 mm thickness) was 0.23.

(2) Preparing a Laser-Absorptive Resin Member

One laser-absorptive resin member 2 was prepared in the same manner as in preparing a laser-weakly-absorptive resin member except that an amount of the non-fiber reinforced polyamide resin 9T (Genestar N1000A) was 494.0 g, 6.0 g of Nigrosine A was used. The transmittances and the absorbances of the laser-absorptive resin member 2 were determined on the basis of the calibration curve obtained in preparing a laser-weakly-absorptive resin member. Consequently, the transmittance is 0% and the absorbance a2 (converted into 1 mm thickness) was 9.8. The absorbance ratio $a_2/a_1$ was 42.6.

(3) Producing a Laser Welded Body

A laser welded body 10 of Example 7 was produced in the same manner as in Example 1-1 except that the output power of the diode laser was 120 W, and the scan speed was 100 mm/second. With respect to the obtained laser welded body 10, measuring the tensile strength and evaluating the welded state were conducted in the same manner as in Example 1-1. Consequently, the tensile strength was 1010 N and the welded state was Excellent.

Comparative Example 7

One laser-weakly-absorptive resin member 1 was prepared in the same manner as in Example 7 except that 0.1 g of nigrosine hydrochloride (NUBIAN BLACK NH-805) was used instead of Nigrosine A. Further, one laser-absorptive resin member 2 was prepared in the same manner as in Example 7 except that 6.0 g of nigrosine hydrochloride (NUBIAN BLACK NH-805) was used instead of Nigrosine A. With respect to the obtained resin members 1, 2, the transmittances and the absorbances were measured in the same manner as in Example 7. The transmittance of the laser-weakly-absorptive resin member 1 was 50.7% and the absorbance $a_1$ (converted into 1 mm thickness) was 0.28. The transmittance of the laser-absorptive resin member 2 was 0% and the absorbance $a_2$ (converted into 1 mm thickness) was 10.3. The absorbance ratio $a_2/a_1$ was 36.8. Then, a laser welded body of Comparative example 7 was produced in the same manner as in Example 7. With respect to the obtained laser welded body, measuring the tensile strength and evaluating the welded state were conducted in the same manner as in Example 1-1. Consequently, the tensile strength was 803 N and the welded state was Excellent.

INDUSTRIAL APPLICABILITY

The laser welded body of the present invention has greatly high applicability in industry because the laser welded body thereof is suitably and extensively apply to parts for transportation equipment (especially automobile) such as an instrument panel used for an interior, a resonator (muffler) in an engine compartment, a head cover for an engine, a drive system, a brake system, a lighting assembly for vehicle; an electric component; parts for electric and electronic equipment; parts for an industrial machine; a tube used for infusion of transfusion and nutritive solution; a packing material for a food product such as a spout pouch putting a liquid food product and a beverage composition; a label for a PET bottle; and parts for household electrical goods such as a housing.

EXPLANATION OF LETTERS OR NUMERALS

Numerals mean as follows. 1: laser-weakly-absorptive resin member, 1a: first laser-weakly-absorptive resin member piece, 1b: second laser-weakly-absorptive resin member piece, 1c: margin part, 2: laser-absorptive resin member, 2a: first laser-absorptive resin member piece, 2b: second laser-absorptive resin member piece, 2c: margin part, 3: lid, 3a: head part, 3b: sleeve part, 3c: stepped part, 4: cylindrical container, 4a: opening edge, 11: laser-transmissible resin member, 12: laser-absorptive resin member, 13: conventional laser welded body, B: butted part, $B_1$: upper butted part, $B_2$: lower butted part, L: laser beam, M: welded part, N, $N_{1-2a}$, $N_{1-2b}$, $N_{1a-2}$, $N_{1b-2}$: contacted part, X, Y: direction

What is claimed is:

1. A laser welded body comprising:
   a first resin member which is a laser-irradiated subject, contains a thermoplastic resin and nigrosine sulfate and has an absorbance $a_1$ of 0.09 to 0.9 and
   a second resin member which contains a thermoplastic resin as the same kind as or different kind from the thermoplastic resin and a laser beam absorbent and has an absorbance $a_2$ of 3.0 to 15,
   wherein the first resin member and the second resin member are laser-welded at a part at which the both resin members are overlapped and/or butted and
   a sulfate ion concentration of the nigrosine sulfate is 0.3 to 5.0% by mass.

2. The laser welded body according to claim 1, wherein an absorbance ratio $a_2/a_1$ of the absorbance $a_2$ to the absorbance $a_1$ is 5 to 70.

3. The laser welded body according to claim 1, wherein the laser beam absorbent is nigrosine sulfate and/or carbon black.

4. The laser welded body according to claim 1, wherein volume resistivity of the nigrosine sulfate is $5.0 \times 10^9$ to $7.0 \times 10^{11}$ Ω·cm.

5. The laser welded body according to claim 3, wherein the carbon black has 12 to 40 nm of a primary particle size, and 150 to 380 m²/g of a nitrogen adsorption specific surface area.

6. The laser welded body according to claim 1, wherein the thermoplastic resin is at least one selected from the group consisting of a polyamide resin, a polycarbonate resin, a polyphenylene sulfide resin, a polyethylene terephthalate resin, a polybutylene terephthalate resin and a polypropylene resin.

7. The laser welded body according to claim 1, wherein the first resin member and/or the second resin member contain a coloring agent containing anthraquinone.

8. The laser welded body according to claim 7, wherein the anthraquinone is an anthraquinone salt-forming dye.

9. The laser welded body according to claim 8, wherein the anthraquinone salt-forming dye is represented by $A^-B^+$ ($A^-$ is an anion from the anthraquinone and $B^+$ is a cation from an organic ammonium compound) or AB (A is a residue of the anthraquinone and B is a residue of an organic ammonium compound).

10. A method for producing a laser welded body comprising:
    forming a faced part by overlapping and/or butting a first resin member which contains a thermoplastic resin and nigrosine sulfate of which a sulfate ion concentration is 0.3 to 5.0% by mass and has an absorbance $a_1$ of 0.09 to 0.9, and a second resin member which contains a thermoplastic resin as the same kind as or different kind from the thermoplastic resin and a laser beam absorbent and has an absorbance $a_2$ of 3.0 to 15 and
    melting at least a part of the first resin member and the second resin member at the faced part by irradiating with a laser beam from a side of the first resin member to weld the first resin member and the second resin member.

11. The method for producing the laser welded body according to claim 10 comprising irradiating with the laser beam at a scan speed of 100 to 300 mm/second.

\* \* \* \* \*